(12) United States Patent
Rico Alvarino et al.

(10) Patent No.: US 11,432,332 B2
(45) Date of Patent: Aug. 30, 2022

(54) INCREASING PHYSICAL RANDOM ACCESS CAPACITY USING ORTHOGONAL COVER CODES

(71) Applicant: Qualcomm Incorporated, San Diego, CA (US)

(72) Inventors: Alberto Rico Alvarino, San Diego, CA (US); Wanshi Chen, San Diego, CA (US); Xiao Feng Wang, San Diego, CA (US); Le Liu, Fremont, CA (US); Umesh Phuyal, San Diego, CA (US); Peng Cheng, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 16/652,140

(22) PCT Filed: Sep. 25, 2018

(86) PCT No.: PCT/CN2018/107321
§ 371 (c)(1),
(2) Date: Mar. 30, 2020

(87) PCT Pub. No.: WO2019/062707
PCT Pub. Date: Apr. 4, 2019

(65) Prior Publication Data
US 2020/0252972 A1 Aug. 6, 2020

(30) Foreign Application Priority Data
Sep. 29, 2017 (WO) ............... PCT/CN2017/104266

(51) Int. Cl.
*H04W 74/08* (2009.01)
*H04L 27/26* (2006.01)

(52) U.S. Cl.
CPC ..... *H04W 74/0833* (2013.01); *H04L 27/2602* (2013.01)

(58) Field of Classification Search
None
See application file for complete search history.

(56) References Cited

U.S. PATENT DOCUMENTS 10,397,958 B2 * 8/2019 Tsai .................. H04W 74/0833
10,743,351 B2 * 8/2020 Hwang ............. H04W 74/0833
(Continued)

FOREIGN PATENT DOCUMENTS

CN 101835263 A 9/2010
CN 102123014 A 7/2011
(Continued)

OTHER PUBLICATIONS

Fujitsu: "Discussion on 4-step RA Procedure", 3GPP Draft, 3GPP TSG RAN WG1 NR Ad-hoc#2, R1-1710234, Discussion on 4-step RA Procedure Final, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299454, 7 Pages.
(Continued)

*Primary Examiner* — Ayaz R Sheikh
*Assistant Examiner* — Faiyazkhan Ghafoerkhan
(74) *Attorney, Agent, or Firm* — Holland & Hart LLP

(57) ABSTRACT

Methods, systems, and devices for increasing physical random access channel (PRACH) capacity using orthogonal cover codes (OCCs) in wireless communications systems are described. A base station may transmit a PRACH configuration that indicates PRACH resources for system access, for example, in a system information block (SIB). A user equipment (UE) may receive the PRACH configura-
(Continued)

tion, and may identify PRACH resources that support OCCs for system access. For example, PRACH configurations with small time domain spacing between PRACH resources may support OCCs. The UE may determine whether to transmit random access (RACH) preamble messages using OCCs in the PRACH resources, and may transmit a RACH preamble message to the base station based on the determination. In some cases, the base station may additionally indicate PRACH resources not configured for OCCs, and the UE may determine which set of resources to transmit in based on one or more parameters.

37 Claims, 19 Drawing Sheets

(56) References Cited

U.S. PATENT DOCUMENTS

| | | | | |
|---|---|---|---|---|
| 10,999,873 | B2* | 5/2021 | Liu | H04W 72/0466 |
| 2016/0295609 | A1 | 10/2016 | Vajapeyam et al. | |
| 2017/0019894 | A1 | 1/2017 | Nimbalker et al. | |
| 2018/0242367 | A1* | 8/2018 | Kim | H04W 74/0833 |
| 2018/0270869 | A1* | 9/2018 | Tsai | H04W 74/006 |
| 2019/0274168 | A1* | 9/2019 | Hwang | H04L 5/0012 |
| 2019/0387550 | A1* | 12/2019 | Pan | H04W 74/0833 |
| 2019/0387551 | A1* | 12/2019 | Liu | H04L 27/2607 |
| 2020/0252972 | A1* | 8/2020 | Rico Alvarino | H04L 5/0094 |
| 2021/0235508 | A1* | 7/2021 | Liu | H04L 27/2607 |

FOREIGN PATENT DOCUMENTS

| | | |
|---|---|---|
| CN | 102130761 A | 7/2011 |
| CN | 103716895 A | 4/2014 |
| CN | 106572543 A | 4/2017 |
| CN | 107113261 A | 8/2017 |
| EP | 3393069 A1 | 10/2018 |
| WO | WO-2014048177 A1 | 4/2014 |
| WO | WO-2016106496 A1 | 7/2016 |
| WO | WO-2017030412 A1 | 2/2017 |
| WO | WO-2017105005 A1 | 6/2017 |

OTHER PUBLICATIONS

NTT Docomo: "Views on PRACH Repetition in Rel-13 Low Complexity UE", 3GPP Draft, 3GPP TSG RAN WG1 Meeting #82bis, R1-155928, RACH Repetition for LC-MTC, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 5, 2015-Oct. 9, 2015, Oct. 4, 2015 (Oct. 4, 2015), XP051002710, 3 Pages.
Supplementary European Search Report—EP18863390—Search Authority—Munich—dated Mar. 24, 2021.
3GPP TR 38.912 V1.0.0, 3rd Generation Partnership Project; Technical Specification Group Radio Access Network; Study on New Radio (NR) Access Technology, (Release 14), Mar. 2017, pp. 1-74.
International Search Report and Written Opinion—PCT/CN2018/107321—ISA/EPO—dated Jan. 4, 2019.
International Search Report and Written Opinion—PCT/CN2017/104266—ISA/EPO—dated Jun. 27, 2018.

* cited by examiner

INCREASING PHYSICAL RANDOM ACCESS CAPACITY USING ORTHOGONAL COVER CODES

CROSS REFERENCES

The present 371 application for patent claims priority to International Patent Application No. PCT/CN2018/107321 to RICO ALVARINO et. al., titled "INCREASING PHYSICAL RANDOM ACCESS CAPACITY USING ORTHOGONAL COVER CODES", filed Sep. 25, 2018; and to International Patent Application No. PCT/CN2017/104266 to RICO ALVARINO et. al., titled "INCREASING PHYSICAL RANDOM ACCESS CAPACITY USING ORTHOGONAL COVER CODES", filed Sep. 29, 2017, each of which is assigned to the assignee hereof.

BACKGROUND

The following relates generally to wireless communication, and more specifically to increasing physical random access channel (PRACH) capacity using orthogonal cover codes (OCCs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may initialize a system access procedure by transmitting a PRACH or random access (RACH) preamble message in the PRACH. However, as the UE has yet to gain access to the base station, these PRACH resources may be shared with any other UEs attempting to access the system. In such a contention-based system, large numbers of UEs attempting to access the system simultaneously using the limited resources of the PRACH may result in collisions, unreliable system access procedures, and increased latency in the wireless communications system.

SUMMARY

The described techniques relate to improved methods, systems, devices, or apparatuses that support increasing physical random access channel (PRACH) capacity using orthogonal cover codes (OCCs). Generally, the described techniques provide for a base station transmitting an indication of a PRACH configuration in a system information block (SIB) or in downlink control information (DCI). A user equipment (UE) may receive the indicated PRACH configuration, and may identify PRACH resources corresponding to the PRACH configurations. In some cases, these PRACH resources may support using OCCs, while in other cases, a subset of these resources may support using OCCs. The UE may determine whether to transmit a random access (RACH) preamble message—or repetitions of the RACH preamble message—in PRACH resources supporting OCCs. In some cases, the UE may instead determine to transmit the RACH preamble message in PRACH resources not configured for OCCs. The UE may transmit the RACH preamble message to the base station in the determined resources to initiate a system access procedure, and in some cases may receive a RACH response message in return. The response message may be based on the whether the RACH preamble message was transmitted using an OCC or not, or based on the specific cover code used by the UE. The use of OCCs may increase the capacity of the PRACH, improving reliability and reducing the latency of system access procedures.

A method of wireless communication is described. The method may include receiving a PRACH resource configuration indicating a set of PRACH resources for a cell, identifying, from the set of PRACH resources, a subset of PRACH resources for performing system access using OCCs, determining whether to perform system access on the cell using the subset of the set of PRACH resources, and transmitting a random access preamble message for the system access based at least in part on the determining.

An apparatus for wireless communication is described. The apparatus may include means for receiving a PRACH resource configuration indicating a set of PRACH resources for a cell, means for identifying, from the set of PRACH resources, a subset of PRACH resources for performing system access using OCCs, means for determining whether to perform system access on the cell using the subset of the set of PRACH resources, and means for transmitting a random access preamble message for the system access based at least in part on the determining.

Another apparatus for wireless communication is described. The apparatus may include a processor, memory in electronic communication with the processor, and instructions stored in the memory. The instructions may be executable by the processor to cause the apparatus to receive a PRACH resource configuration indicating a set of PRACH resources for a cell, identify, from the set of PRACH resources, a subset of PRACH resources for performing system access using OCCs, determine whether to perform system access on the cell using the subset of the set of PRACH resources, and transmit a random access preamble message for the system access based at least in part on the determining.

A non-transitory computer-readable medium for wireless communication is described. The non-transitory computer-readable medium may include instructions executable by a processor to receive a PRACH resource configuration indicating a set of PRACH resources for a cell, identify, from the set of PRACH resources, a subset of PRACH resources for performing system access using OCCs, determine whether to perform system access on the cell using the subset of the set of PRACH resources, and transmit a random access preamble message for the system access based at least in part on the determining.

In some examples of the method, apparatus, and non-transitory computer-readable medium described above, identifying the subset of PRACH resources supporting OCCs comprises identifying an OCC applicability criteria associated with supporting OCCs for the set of PRACH resources. Some examples of the method, apparatus, and non-transitory computer-readable medium described above may further include processes, features, means, or instructions for determining that the PRACH resource configuration supports OCCs based on the set of PRACH resources and the OCC applicability criteria.

In some examples of the method, apparatus, and non-transitory computer-readable medium described above, the PRACH resource configuration comprises a number of contiguous PRACH transmission opportunities greater than or equal to an OCC length.

In some examples of the method, apparatus, and non-transitory computer-readable medium described above, the OCC applicability criteria comprises a repetition separation time threshold, wherein the PRACH resource configuration comprises PRACH transmission opportunities separated in a time domain by a length of time less than the repetition separation time threshold.

Some examples of the method, apparatus, and non-transitory computer-readable medium described above may further include processes, features, means, or instructions, from the set of PRACH resources, a second subset of PRACH resources not configured for supporting OCCs.

In other examples of the method, apparatus, and non-transitory computer-readable medium described above, determining whether to perform system access on the cell using the subset of PRACH resources comprises selecting between the subset of PRACH resources and the second subset of PRACH resources based at least in part on a random or pseudo-random function. Some examples of the method, apparatus, and non-transitory computer-readable medium described above may further include processes, features, means, or instructions for performing system access on the cell based at least in part on the selection.

Some examples of the method, apparatus, and non-transitory computer-readable medium described above may further include processes, features, means, or instructions for identifying a weight value associated with selecting either the subset of PRACH resources or the second subset of PRACH resources, wherein selecting between the subset of PRACH resources and the second subset of PRACH resources may be based at least in part on the weight value.

In some examples of the method, apparatus, and non-transitory computer-readable medium described above, determining whether to perform system access on the cell using the subset of PRACH resources or the second subset of PRACH resources is based at least in part on a transmission type associated with the system access.

In some examples of the method, apparatus, and non-transitory computer-readable medium described above, the transmission type comprises a first type of system access for radio resource control (RRC) connection or a second type of system access for connection-less data transmission.

In some examples of the method, apparatus, and non-transitory computer-readable medium described above, the subset of PRACH resources and the second subset of PRACH resources overlap.

In some examples of the method, apparatus, and non-transitory computer-readable medium described above, the PRACH resource configuration comprises an OCC PRACH resource configuration. In some examples of the method, apparatus, and non-transitory computer-readable medium described above, the subset of PRACH resources comprises a set of concentrated PRACH resources that may be contiguous or separated in a time domain by less than a repetition separation time threshold. In some examples of the method, apparatus, and non-transitory computer-readable medium described above, the subset of PRACH resources spans a length of time greater than or equal to an OCC length for the random access preamble message.

Some examples of the method, apparatus, and non-transitory computer-readable medium described above may further include processes, features, means, or instructions for identifying, from the set of PRACH resources, a second subset of PRACH resources not configured for supporting OCCs, wherein the second subset of PRACH resources comprises a set of distributed resources that may be separated in the time domain by an equal number of subframes or separated in the time domain by either a first number of subframes or a second number of subframes differing from the first number by one subframe.

Some examples of the method, apparatus, and non-transitory computer-readable medium described above may further include processes, features, means, or instructions for receiving a random access response message in response to the random access preamble message.

Some examples of the method, apparatus, and non-transitory computer-readable medium described above may further include processes, features, means, or instructions for identifying the random access response message based at least in part on a random access preamble identifier of the random access response message, a random access radio network temporary identifier (RNTI) of the random access response message, an OCC index included in the random access response message, or a combination thereof.

Some examples of the method, apparatus, and non-transitory computer-readable medium described above may further include processes, features, means, or instructions for receiving a DCI transmission comprising an OCC index, a random access preamble, or both, wherein determining whether to perform system access on the cell using the subset of PRACH resources may be based at least in part on the DCI transmission.

Some examples of the method, apparatus, and non-transitory computer-readable medium described above may further include processes, features, means, or instructions for determining an OCC length for the system access based at least in part on the PRACH resource configuration.

Some examples of the method, apparatus, and non-transitory computer-readable medium described above may further include processes, features, means, or instructions for performing frequency hopping for transmitting the random access preamble message, wherein the frequency hopping may be based at least in part on an OCC length for the system access.

Some examples of the method, apparatus, and non-transitory computer-readable medium described above may further include processes, features, means, or instructions for selecting, for the random access preamble message, a random preamble, a random OCC cover, or both.

A method of wireless communication is described. The method may include determining a set of PRACH resources, the set of PRACH resources comprising a subset of the set of PRACH resources for performing system access using OCCs, transmitting a PRACH resource configuration indicating the set of PRACH resources and the subset of the set of PRACH resources, and receiving a random access preamble message for the system access in the set of PRACH resources.

An apparatus for wireless communication is described. The apparatus may include means for determining a set of PRACH resources, the set of PRACH resources comprising a subset of the set of PRACH resources for performing system access using OCCs, means for transmitting a PRACH resource configuration indicating the set of PRACH resources and the subset of the set of PRACH resources, and means for receiving a random access preamble message for the system access in the set of PRACH resources.

Another apparatus for wireless communication is described. The apparatus may include a processor, memory in electronic communication with the processor, and instructions stored in the memory. The instructions may be executable by the processor to cause the apparatus to determine a set of PRACH resources, the set of PRACH resources comprising a subset of the set of PRACH resources for performing system access using OCCs, transmit a PRACH resource configuration indicating the set of PRACH resources and the subset of the set of PRACH resources, and receive a random access preamble message for the system access in the set of PRACH resources.

A non-transitory computer-readable medium for wireless communication is described. The non-transitory computer-readable medium may include instructions executable by a processor to determine a set of PRACH resources, the set of PRACH resources comprising a subset of the set of PRACH resources for performing system access using OCCs, transmit a PRACH resource configuration indicating the set of PRACH resources and the subset of the set of PRACH resources, and receive a random access preamble message for the system access in the set of PRACH resources.

In some examples of the method, apparatus, and non-transitory computer-readable medium described above, receiving the random access preamble message comprises receiving the random access preamble message in the subset of the set of PRACH resources, wherein the random access preamble message comprises a random preamble, a random OCC cover, or both.

In some examples of the method, apparatus, and non-transitory computer-readable medium described above, the PRACH resource configuration comprises a number of contiguous PRACH transmission opportunities greater than or equal to an OCC length. In some examples of the method, apparatus, and non-transitory computer-readable medium described above, the PRACH resource configuration comprises PRACH transmission opportunities separated in a time domain by a length of time less than a repetition separation time threshold.

In some examples of the method, apparatus, and non-transitory computer-readable medium described above, the subset of the set of PRACH resources may be a first subset of the set of PRACH resources. In some examples of the method, apparatus, and non-transitory computer-readable medium described above, the set of PRACH resources comprises a second subset of the set of PRACH resources not configured for supporting OCCs.

In some examples of the method, apparatus, and non-transitory computer-readable medium described above, receiving the random access preamble message for the system access in the set of PRACH resources comprises receiving the random access preamble message in the first subset of the set of PRACH resources or in the second subset of the set of PRACH resources based at least in part on a configuration of a UE.

In some examples of the method, apparatus, and non-transitory computer-readable medium described above, the PRACH resource configuration comprises an OCC PRACH resource configuration. In some examples of the method, apparatus, and non-transitory computer-readable medium described above, the subset of the set of PRACH resources comprises a set of concentrated PRACH resources that may be contiguous or separated in a time domain by less than a repetition separation time threshold. In some examples of the method, apparatus, and non-transitory computer-readable medium described above, the set of concentrated PRACH resources spans a length of time greater than or equal to an OCC length.

Some examples of the method, apparatus, and non-transitory computer-readable medium described above may further include processes, features, means, or instructions for transmitting a random access response message in response to the random access preamble message.

In some examples of the method, apparatus, and non-transitory computer-readable medium described above, the random access response message comprises a random access preamble identifier, a random access RNTI, an OCC index, or a combination thereof.

DETAILED DESCRIPTION

Figure 1:
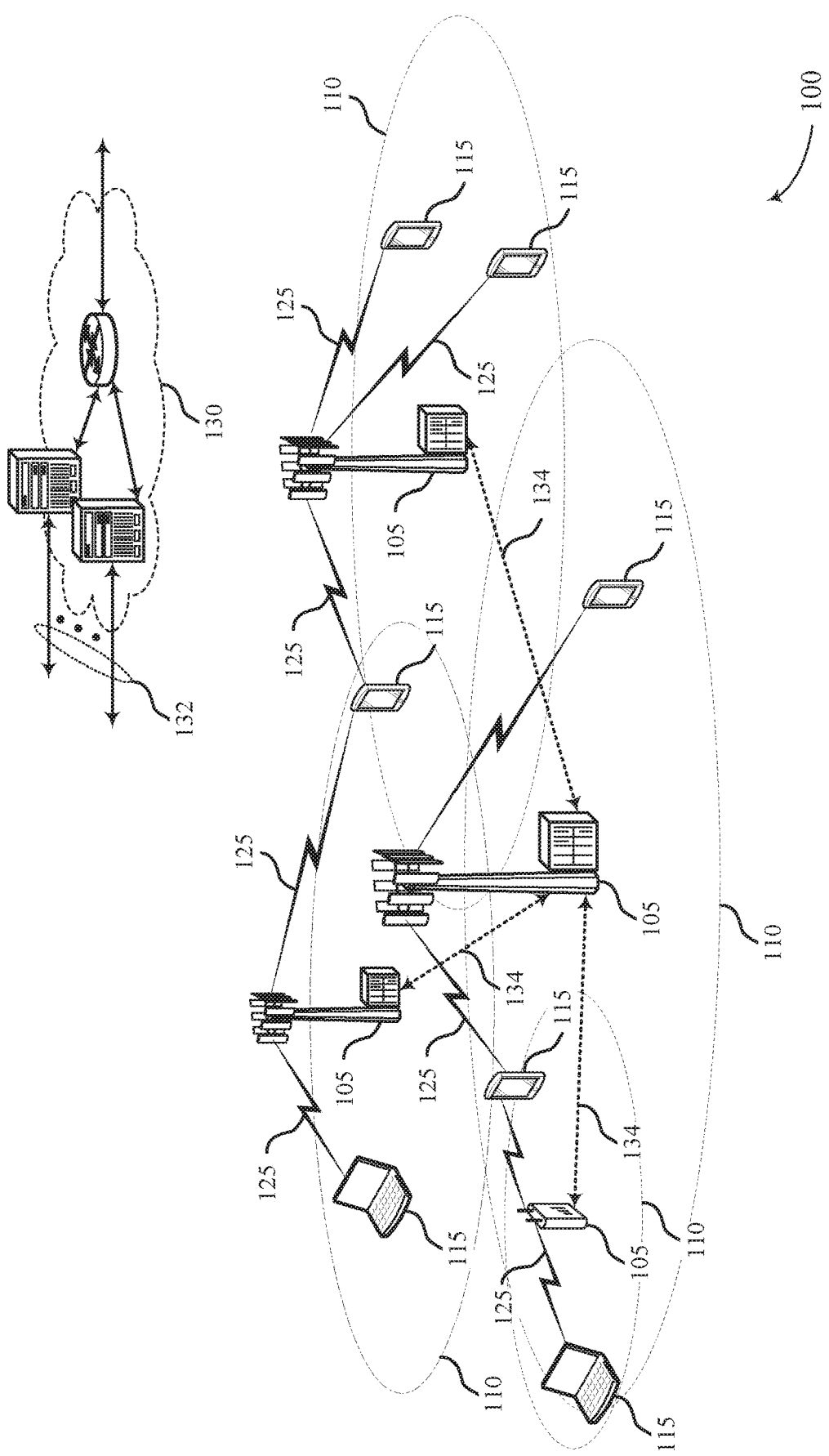
FIGS. 1 and 2 illustrate examples of wireless communications systems that support increasing physical random access channel (PRACH) capacity using orthogonal cover codes (OCCs) in accordance with aspects of the present disclosure.

Some wireless communications systems may support increasing physical random access channel (PRACH) capacity using orthogonal cover codes (OCCs). Implementing OCCs may allow for increased multiplexing of user equipment (UEs), resulting in a greater channel capacity for the PRACH. Many wireless communications systems may include both "legacy" UEs (e.g., UEs not configured to use these OCCs) and "enhanced" UEs (e.g., UEs enhanced to use these OCCs). The following methods and techniques may support both of these types of UEs, where the enhanced UEs may utilize the increased capacity of the PRACH.

To implement OCCs in the PRACH, a base station may transmit an indication of one or more PRACH configurations in a system information block (SIB) or in downlink control information (DCI). A user equipment (UE) may detect and receive the indicated PRACH configurations, and may identify PRACH resources corresponding to the PRACH configurations. In some cases, these PRACH resources may support using OCCs, while in other cases, a subset of these resources—"enhanced" PRACH resources—may support using OCCs and a second subset—"legacy"

PRACH resources—may not support using OCCs. The UE may determine how to transmit a random access (RACH) preamble message—or repetitions of the RACH preamble message—in the indicated PRACH resources. In some cases, the RACH preamble message may be referred to as a RACH initial message, a RACH Message 1 (Msg1) transmission, or some similar term.

In one aspect, to determine how to transmit the RACH preamble messages (e.g., using an OCC or not using an OCC), the UE may determine whether the PRACH configuration supports OCCs. Some PRACH configurations may support using OCCs based on OCC applicability criteria (e.g., back-to-back PRACH subframes, PRACH resources separated by less than a threshold time, etc.). In other cases, "enhanced" PRACH configurations may be designed to include concentrated PRACH resources, which may support contiguous RACH preamble message transmissions using OCCs. In some cases, the UE may determine between a set of enhanced PRACH resources and a set of legacy PRACH resources based on a random or pseudo-random selection process, a weight value, or a type of transmission to perform. Once the UE has determined how to transmit the RACH preamble message, the UE may transmit the RACH preamble message to the base station to initiate the system access process. In some cases, the UE may receive a RACH preamble response message in return. The response message may be based on the whether the RACH preamble message was transmitted using an OCC or not, or based on the specific cover code used by the UE. In some cases, the UE may additionally implement frequency hopping, randomization, or frequency shifts to further improve the reliability of the PRACH.

Aspects of the disclosure are initially described in the context of wireless communications systems. Additional aspects are illustrated and described with respect to resource grids and a process flow. Aspects of the disclosure are further illustrated by and described with reference to apparatus diagrams, system diagrams, and flowcharts that relate to increasing physical random access capacity using orthogonal cover codes.

FIG. 1 illustrates an example of a wireless communications system 100 that supports increasing PRACH capacity using OCCs in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink transmissions (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support increasing PRACH capacity using OCCs. A base station 105 may transmit an indication of PRACH resources, for example, in a SIB or in DCI. A UE 115 may detect the transmission, and may decode the signal to determine one or more PRACH resource configurations for transmission of RACH preamble messages. In some cases, the UE 115 may identify a single PRACH configuration that supports both using OCCs and not using OCCs. In other cases, the UE 115 may identify a PRACH configuration supporting OCCs and a second PRACH configuration not supporting OCCs, and the UE 115 may determine whether to transmit using an OCC or not. Regardless of which set of resources the UE 115 selects, the UE 115 may transmit repeated RACH preamble messages to the base station 105. The base station 105, which may be monitoring the PRACH resources, may detect and receive one or more of the RACH preamble transmissions, and may respond with a RACH preamble response message. The RACH preamble response message may be based on whether the UE 115 used an OCC, and/or which OCC the UE 115 used. Enhancing the PRACH resources with OCC functionality may increase the capacity of the PRACH, allowing more UEs 115 to perform system access procedure at any given time.

Figure 2:
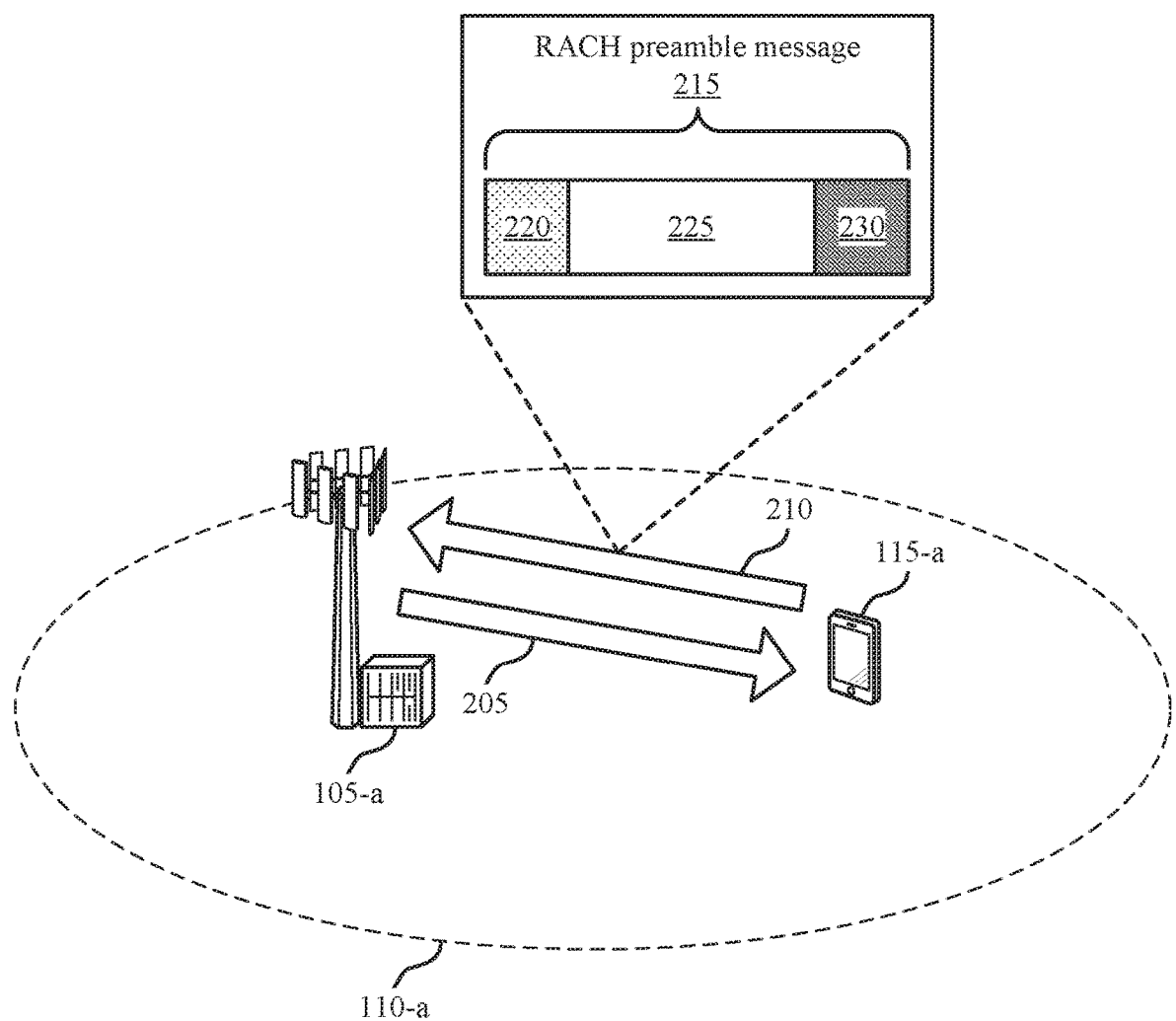

FIG. 2 illustrates an example of a wireless communications system 200 that supports increasing PRACH capacity using OCCs in accordance with various aspects of the present disclosure. The wireless communications system 200 may include base station 105-*a* and UE 115-*a*, which may be examples of a base station 105 and a UE 115, as described with reference to FIG. 1. Base station 105-*a* may transmit to UE 115-*a* over downlink transmission link 205, and UE 115-*a* may transmit to base station 105-*a* over uplink transmission link 210. Base station 105-*a* may transmit indications of PRACH resource configurations that support OCCs, and UE 115-*a* may identify the PRACH resources and transmit a RACH preamble message 215 to base station 105-*a* using the PRACH resources. A RACH preamble message 215 may include a cyclic prefix 220, a sequence 225, a guard time 230, or any combination of these components.

Some wireless communication systems (e.g., enhanced machine-type communication (eMTC) systems) may support coverage extensions for physical channels (e.g., PRACH, PUCCH, PDCCH, etc.). For example, a UE 115— such as UE 115-*a*—may extend PRACH coverage by transmitting repeated RACH preamble messages 215 to base station 105-*a* in PRACH resources. Base station 105-*a* may transmit an indication of one or more PRACH configurations, for example, in a SIB. UE 115-*a* may determine PRACH resources for a radio frame or a set of radio frames based on the indication. UE 115-*a* may transmit repeated RACH preamble messages 215 in multiple PRACH resources within a radio frame or across radio frames. When UE 115-*a* determines to connect to base station 105-*a*, UE 115-*a* may select the next available PRACH resource for an initial RACH preamble message 215 transmission. However, in some cases, only a subset of subframes or radio frames may support UE 115-*a* transmitting RACH preamble messages 215 or an initial RACH preamble message 215. In such cases, UE 115-*a* may determine in which subframes or radio frames it may transmit the initial RACH preamble message 215 based on a repetition value. For example, for a repetition value of 4, UE 115-*a* may transmit the initial RACH preamble message 215 in one out of four radio frames (e.g., radio frame 0 and repeated in radio frames 1 through 3, or radio frame 4 and repeated in radio frames 5 through 7, etc.). Based on the PRACH resource selected for transmitting the initial RACH preamble message 215, UE 115-*a* may determine PRACH resources for transmitting repetition RACH preamble message 215. For example, UE 115-*a* may transmit the repetitions in the next available PRACH resources following the initial selected resource. These PRACH resources for the initial and repetition transmissions may be examples of contiguous or non-contiguous PRACH resources based on the PRACH configuration.

In some systems implementing the transmission of repeated RACH preamble messages 215, base station 105-a and UE 115-a may further increase the PRACH capacity by using OCCs across the repeated PRACH transmissions. For example, to implement OCCs across repeated PRACH transmissions, UE 115-a may transmit repeated RACH preamble messages 215 using code division multiplexing (CDM) with a cover code, such as a cover code using code values of [+1, −1] (e.g., in one specific case, a UE 115 (not shown) may transmit two preambles with code [+1, +1], and UE 115-a may transmit two preambles with code [+1, −1]). The OCCs may provide an orthogonal CDM dimension to transmissions of RACH preamble messages 215 by different UEs 115 across the same or overlapping sets of subframes.

A receiver, for example a receiver at base station 105-a, may receive orthogonal signals when OCCs are applied to contiguous signals. For example, signals transmitted in back-to-back transmission opportunities may be proximate enough in time to mitigate Doppler or phase discontinuities, so the receiver may receive the orthogonal signals. Accordingly, using OCCs on these signals may effectively apply orthogonality to the signals. However, signals transmitted at non-contiguous intervals in the time domain may be affected by Doppler or phase discontinuities when received by a receiver. For example, a UE 115 may lose phase continuity at a receiver if the UE 115 stops transmitting. Applying OCCs to such signals may not result in orthogonality at the receiver due to these phase discontinuities, and accordingly the signals may interfere with one another. To support sufficient phase continuity, a UE 115 may selectively apply OCCs to transmissions based on the PRACH resources. For example, in one aspect, the UE 115 may apply OCCs in contiguous transmissions—when the UE 115 may continuously transmit signals—and may not apply OCCs in other cases. In a second aspect, a UE 115 may apply OCCs to transmissions separated in time by a length of time equal to or less than a threshold length of time, and may not apply OCCs to transmissions separated in time by a length of time greater than the threshold length of time. The threshold length of time may be selected or configured based on a manageable level of phase discontinuity.

For repetitions of RACH preamble messages 215, the separation of the messages in time may be based on the PRACH configuration used by base station 105-a and UE 115-a. For example, different PRACH configurations may define different subframes for transmission of RACH preamble messages 215, as well as different lengths for the RACH preamble messages 215. Certain PRACH configurations have been defined for use by UEs 115. These PRACH configurations may be referred to as "legacy" PRACH configurations (which may be pre-Release 14 PRACH configurations). Such legacy PRACH configurations may have defined values for PRACH subframe configurations, preamble formats, system frame numbers, and subframe numbers. In many cases, the PRACH configurations may include distributed PRACH resources with uniform or nearly-uniform spacing in time. For example, each PRACH resource may be separated by a same number of subframes, or by a number of subframes differing at most by one subframe. For example, the legacy PRACH configuration with index 12 has PRACH resources uniformly distributed in subframes 0, 2, 4, 6, and 8. Similarly, the legacy PRACH configuration with index 9 has PRACH resources nearly-uniformly distributed in subframes 1, 4, and 7 (i.e., the PRACH resources in subframes 1 and 4 and the PRACH resources in subframes 4 and 7 are each separated by 3 subframes, while the PRACH resources in subframe 7 in a first radio frame are separated from the PRACH resources in subframe 1 of the subsequent radio frame by 4 subframes). In many of these cases, the separation of PRACH resources in the time domain may be measured from the start of one transmission opportunity to the start of another transmission opportunity. However, in some cases, the separation of PRACH resources may additionally take into account the size of the transmission opportunity (e.g., if based on a preamble format, a transmission opportunity spans multiple subframes, the separation may be measured from the start of the last subframe of PRACH resources to the start of the first subframe of the next PRACH resources).

In one aspect of increasing PRACH capacity using OCCs, a base station 105 and UE 115 may support OCC applicability to legacy formats. For example, one or more of the legacy PRACH configurations may support transmitting RACH preamble messages 215 using OCCs. Which legacy PRACH configurations support OCCs may be based on the spacing of the RACH transmission opportunities corresponding to the PRACH configurations. For example, PRACH configurations corresponding to contiguous RACH preamble message 215 repetitions or corresponding to repeated RACH preamble message 215 transmissions separated by less than or equal to a threshold time length may support OCCs. An "enhanced" UE 115 (e.g., a UE 115 configured to identify and transmit in resources supporting OCCs) may transmit a RACH preamble message 215 using OCCs in the PRACH resources corresponding to this legacy PRACH resource configuration supporting OCCs. Meanwhile, a "legacy" UE 115 (e.g., a UE 115 not configured to support OCCs) may transmit a RACH preamble message 215 without applying an OCC in the PRACH resources corresponding to the legacy PRACH resource configuration.

In a second aspect of increasing PRACH capacity using OCCs, a base station 105 and UE 115 may support separate format indications for OCC or non-OCC transmissions. For example, base station 105-a may signal at least two PRACH configurations, where at least one PRACH configuration indicates PRACH resources supporting OCCs and at least one other PRACH configuration indicates PRACH resources not configured to support OCCs. Legacy UEs 115 may transmit using the PRACH resources not configured to support OCCs, while enhanced UEs 115 may transmit in either set of PRACH resources. For examples, UE 115-a may transmit in PRACH resources supporting OCCs whenever UE 115-a identifies these enhanced resources, or may select which set of resources to use—and, correspondingly, whether or not to apply an OCC—using a random or pseudo-random selection process, which may or may not depend on a weight value. In some cases, base station 105-a may signal this weight value to one or more UEs 115 in a system information block (SIB), dedicated signaling, or a combination of the two.

In a third aspect of increasing PRACH capacity using OCCs, a base station 105 and UE 115 may implement "enhanced" PRACH resource configurations. As opposed to legacy PRACH resource configurations, which are designed with uniform or near-uniform spacing, enhanced PRACH resource configurations may employ a concentrated PRACH resource structure. For example, the PRACH resources may be grouped in a contiguous subset of subframes within a radio frame. In this way, UE 115-a may transmit repeated RACH preamble messages 215 using OCCs in back-to-back transmissions to mitigate phase discontinuities and reduce latency, before waiting a gap period between radio frames for the next set of grouped, consecutive PRACH resources. In some cases, the enhanced PRACH configurations may support more efficient transmission of repeated RACH preamble messages 215 using OCCs than legacy PRACH configurations.

Base station 105-a may respond to a RACH preamble message 215, sent using any of the aspects described above, by transmitting a RACH preamble response message on the downlink transmission link 205. The RACH response may include parameters to differentiate between different RACH preamble messages 215 (e.g., from different UEs 115). For example, if the wireless communications system 200 supports coexistence of enhanced PRACH resources supporting OCCs and legacy PRACH resources not supporting OCCs, the RACH response preamble message may differentiate between RACH preamble messages 215 using OCCs and RACH preamble messages 215 not using OCCs. Additionally or alternatively, the RACH preamble response message may differentiate between different cover codes for RACH preamble messages 215 using OCCs.

To differentiate between these different RACH preamble messages 215, in one aspect, base station 105-a and UE 115-a may utilize RACH preamble identifiers, such as preamble indexes, that are based on a PRACH preamble and the OCC. Base station 105-a may receive a RACH preamble message 215, and may determine a RACH preamble identifier based on a PRACH preamble for the RACH preamble message 215, whether or not the RACH preamble message 215 uses an OCC, and which cover code is used (e.g., if the RACH preamble message 215 implements an OCC). Base station 105-a may include the RACH preamble identifier in the RACH preamble response message, and UEs 115 receiving the RACH preamble response message may decode at least a portion of the message and determine if the RACH preamble identifier corresponds to a RACH preamble message 215 transmitted by that UE 115.

In a second aspect, base station 105-a and UE 115-a may select a radio network temporary identifier (RNTI) or random access-RNTI (RA-RNTI) for encoding or decoding the RACH preamble response message based on a cover code used for the corresponding RACH preamble message 215. For example, base station 105-a and UE 115-a may use a first RNTI in cases where OCCs are not used (e.g., for legacy UEs 115 or UEs 115 that select to transmit in legacy PRACH resources without an OCC). However, if an OCC is applied, base station 105-a and UE 115-a may select an RNTI based on the applied cover code, or simply based on whether an OCC is implemented (e.g., where the applied cover code may be indicated some other way, for example, as part of a preamble identifier or in a field of the RACH response). Base station 105-a may determine the applied cover code when receiving the RACH preamble message 215, may identify the corresponding RNTI, and may encode the RACH preamble response message based on the identified RNTI. UEs 115 that transmit RACH preamble messages 215 may identify the RNTI corresponding to the transmitted RACH preamble message 215. If a UE 115 detects a RACH preamble response message, the UE 115 may attempt to decode the received signals using the identified RNTI. The UE 115, such as UE 115-a, that successfully decodes the RACH preamble response message using an RNTI corresponding to the RACH preamble message 215 may identify the preamble identifier for its RACH preamble message 215 indicated in the RACH response message. Based on the successful decoding with the RNTI and the preamble identifier, UE 115-a may determine that the RACH preamble response message is in response to the RACH preamble message 215 of UE 115-a. Other UEs 115 attempting to decode the RACH response may be unsuccessful based on using incorrect RNTIs or may not determine a preamble identifier corresponding to those UEs 115, as the RACH preamble response message was not encoded based on the parameters these UEs 115 used to transmit RACH preamble messages 215.

In a third aspect, base station 105-a may include a field in the RACH preamble response message to indicate an OCC used for the RACH preamble message 215 transmission. For example, the field may indicate whether or not an OCC was used for the RACH preamble message 215, and may indicate the specific cover code used in cases with OCCs. A UE 115 may determine if the RACH response is in response to a specific RACH preamble message 215 based on if the RACH preamble and the OCC field of the RACH preamble response message correspond to the RACH preamble message 215.

In some cases, base station 105-a may initiate the RACH procedure using a PDCCH order. Base station 105-a may transmit the PDCCH order, which may contain DCI, to UE 115-a to instruct UE 115-a to perform a system access procedure using PRACH. For example, if UE 115-a temporarily loses access to base station 105-a (e.g., due to lack of uplink synchronization), or if base station 105-a identifies that UE 115-a is about to move out of geographic coverage area 110-a and a coverage area for a different base station 105, base station 105-a may command UE 115-a to begin a PRACH system access procedure.

Base station 105-a may include parameters in the PDCCH order indicating how UE 115-a may perform the system access. For example, the PDCCH order may include a preamble identifier or index, a PRACH mask index (e.g., identifying PRACH resources for UE 115-a to use), a starting coverage enhancement (CE) level, other static fields (e.g., set to zero), or some combination of these. Additionally, base station 105-a may include a field in the PDCCH order that indicates an OCC index for UE 115-a to use when applying an OCC. In some cases, the field may additionally indicate a preamble for the RACH preamble message 215.

UE 115-a may determine a length (e.g., a bit length) for an OCC either explicitly or implicitly. In one example, base station 105-a may explicitly signal the OCC length, for example, in DCI or in a SIB. In a second example, UE 115-a may implicitly determine the OCC length based on a PRACH configuration or PRACH format. For example, UE 115-a may set the OCC length to the number of contiguous subframes with PRACH resources. In another example, UE 115-a may contain an indication of a maximum OCC length (e.g., 4 bits), and may determine the OCC length based on the maximum OCC length (e.g., the lesser of the maximum OCC length and the number of contiguous PRACH subframes).

In some cases, UE 115-a may perform frequency hopping in RACH preamble message 215 transmissions, or for RACH preamble message 215 repetitions. In these cases, enhanced UEs 115 may apply OCCs in conjunction with frequency hopping. However, in some examples, the UEs 115 may not apply OCCs across hops. For example, for a given OCC length (e.g., an OCC length of 4), UE 115-a may perform frequency hops at intervals of four or more subframes. After frequency hopping, UE 115-a may restart the OCC when applying the OCC to the subframes following the hop.

UE 115-a may introduce randomness or shifts into RACH preamble messages 215 to improve the probability of successful transmissions. For example, repeating a same preamble across two or more RACH preamble message 215 repetitions may be inefficient, for example, if interference affecting reception of the RACH preamble message 215 is correlated to the selected preamble. To avoid simply repeating a same RACH preamble message 215, UE 115-*a* may select different OCCs, different preambles (e.g., cyclic shifts or cyclic prefixes 220), or both. In one example, UE 115-*a* and base station 105-*a* may include indications of a standard cyclic shift value for repeated transmissions of a RACH preamble message 215. In some cases, the standard cyclic shift value may be a constant value for a cell, so base station 105-*a* may receive repeated RACH preamble messages 215, undo the standard cyclic shift, undo the OCC, and coherently combine the resulting signals. In another example, the standard cyclic shift may be derived based on a physical cell identifier, or may be common across all cells. Such randomness or shifts may improve reception of one or more repeated PRACH transmissions.

Figure 3:
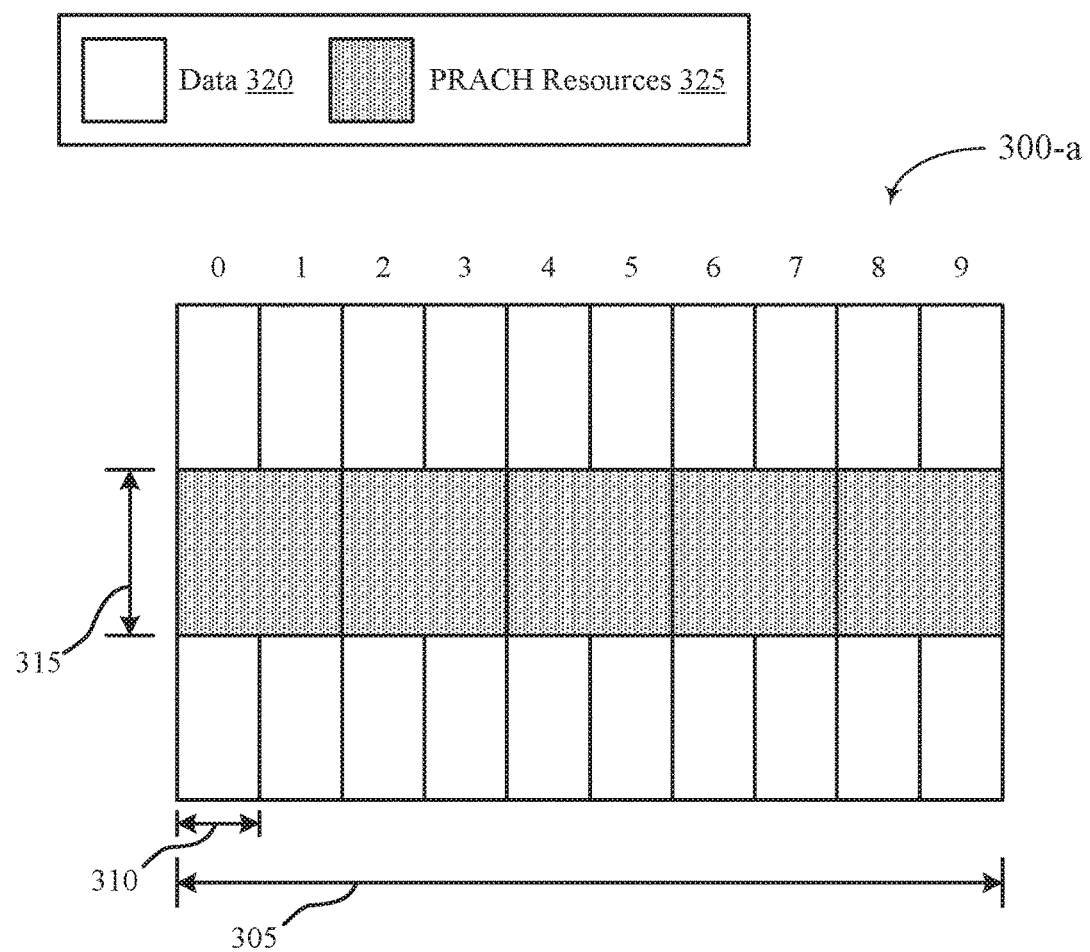
FIGS. 3 through 5 illustrate examples of resource grids that support increasing PRACH capacity using OCCs in accordance with aspects of the present disclosure.
Figure 3:
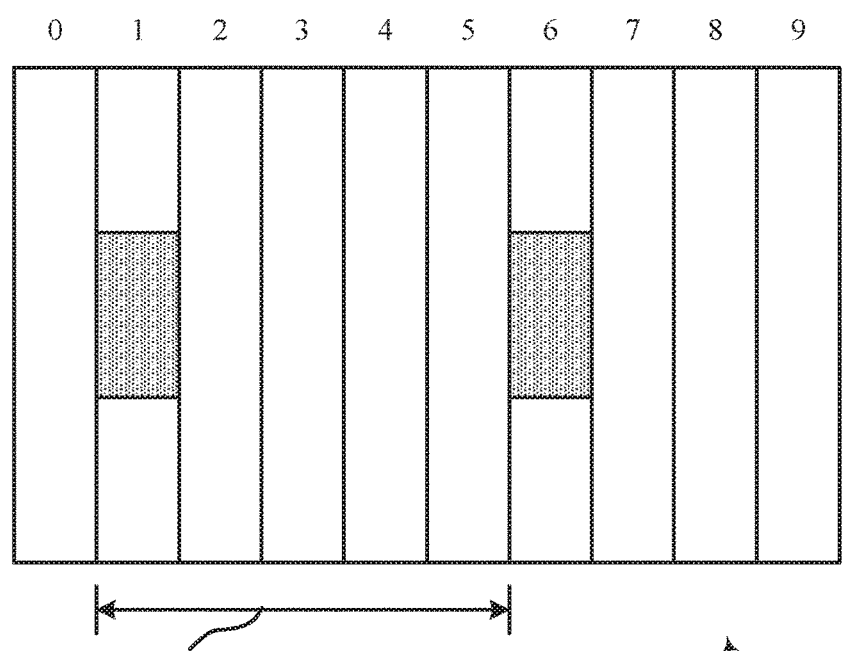

FIG. 3 illustrates an example of resource grids 300 using legacy formats that support increasing PRACH capacity using OCCs in accordance with various aspects of the present disclosure. Resource grids 300 may be examples of legacy or pre-Release 14 PRACH resource configurations. For example, resource grid 300-*a* may be an example of the legacy PRACH resource configuration with index 28, including PRACH resources 325 spanning two subframes and starting in subframe numbers 0, 2, 4, 6, and 8. Resource grid 300-*b* may be an example of the legacy PRACH resource configuration with index 6, including PRACH resources 325 spanning one subframe each and starting in subframe numbers 1 and 6. In some cases, these legacy PRACH resource configurations may support transmission of RACH preamble messages using OCCs based on one or more OCC applicability criteria.

As illustrated, the resource grids 300 may span a radio frame 305, which includes 10 subframes 310. The resource grids 300 may include resources reserved for transmission of data 320 and PRACH resources 325 reserved for transmission of RACH messages. In some cases, the PRACH resources 325 may be positioned within a certain frequency band 315 (e.g., spanning 72 sub-carriers or 1.08 MHz). While two specific legacy PRACH resource configurations are illustrated by resource grids 300-*a* and 300-*b*, the described methods and techniques may apply to many other PRACH resource configurations.

In some cases, a wireless communications system, such as wireless communications systems 100 or 200 as described with reference to FIGS. 1 and 2, may support OCCs on legacy PRACH formats. A base station 105 may signal a legacy PRACH resource configuration (e.g., in a SIB), and a UE 115 may detect the signal and determine the legacy PRACH resource configuration based on information carried in the SIB. In systems supporting OCCs on legacy PRACH resources, the UE 115 may determine whether the signaled PRACH resource configuration supports OCCs. For example, in some cases, a subset of the legacy PRACH resource configurations may support OCCs, while the rest of the legacy PRACH resource configurations may not support OCCs. In some examples, the UE 115 may include an indication (e.g., in a table in memory) of the legacy PRACH resource configurations that support OCCs. In other examples, the base station 105 may include an indication of whether the signaled PRACH resource configuration supports OCCs (e.g., within the SIB). In yet further examples, the UE 115 may determine whether a PRACH resource configuration supports OCCs based on subframe timing of the PRACH resources 325 for the PRACH resource configuration.

Whether a particular legacy PRACH resource configuration supports OCCs may be based on an OCC applicability criterion. One example OCC applicability criterion specifies that legacy PRACH resource configurations with contiguous PRACH resources 325 may support OCCs. That is, a PRACH resource configuration that supports a UE 115 transmitting repeated PRACH preamble messages in back-to-back transmission opportunities may support the UE 115 applying OCCs to these repetitions. Such legacy PRACH resource configurations may have separations of 1 subframe between PRACH resources 325 in the time domain (e.g., measuring from the start of one PRACH transmission opportunity to the next, for preambles of length 1). These legacy PRACH resource configurations may include PRACH configuration index 14, 28, 29, 44, and 45, in which either one subframe or two subframe PRACH resources 325 are back-to-back. For example, resource grid 300-*a*, showing PRACH resource configuration index 28, contains contiguous PRACH resources 325. A UE 115 may transmit repeated PRACH preamble messages back-to-back in each or a subset of these PRACH resources 325. Due to their contiguous nature in the time domain, applying OCCs to the repeated RACH preamble transmissions in the PRACH resources 325 of resource grid 300-*a* may provide orthogonality between the transmissions, with limited or negligible phase discontinuity. However, with such an OCC applicability criterion, the PRACH resource configuration of resource grid 300-*b* may not support OCCs, as the PRACH resources 325 are separated by 5 subframes. A UE 115 may transmit a RACH preamble message in subframe 1, but may need to wait until subframe 6 to repeat the RACH preamble transmission, introducing phase discontinuity between the transmissions. In the above specified OCC applicability criterion, such a separation may not support OCCs.

A second example OCC applicability criterion specifies that legacy PRACH resource configurations with PRACH resources 325 separated in time by less than a threshold time may support OCCs. In such cases, if a UE 115 transmits repeated RACH preamble messages at intervals less than (or equal to) the threshold time, the UE 115 may apply OCCs to the RACH preamble messages. For example, time interval 330 may represent one possible threshold time, M, for supporting application of OCCs. In some cases, time interval 330 may represent a threshold time of M=5 (e.g., 5 ms or 5 subframes). Under such an OCC applicability criterion, more legacy PRACH resource configurations may support OCCs than under the first OCC applicability criterion. For example, the legacy PRACH resource configuration with index 6 in resource grid 300-*b* may support OCCs, as the UE 115 may transmit RACH preambles in subframes 1 and 6, with a separation of 5 subframes, which is less than or equal to the example time threshold of M=5. In some cases, the threshold time M may depend on the PRACH format of a PRACH resource configuration. For example, preamble formats of 1, 2, or 3 may correspond to RACH preambles of longer lengths (e.g., preamble formats 1 and 2 may correspond to 2 subframe PRACH resources 325, and preamble format 3 may correspond to 3 subframe PRACH resources 325). In such cases, if separation is measured by the start of PRACH resources 325 or RACH preamble transmissions, "back-to-back" transmissions may have separations of 2 or 3 subframes for the longer RACH preamble lengths.

Some wireless systems may include a first subset of UEs 115 that may apply OCCs to RACH preamble repetitions and a second subset of UEs 115 that may not support OCC functionality for RACH preamble repetitions. The first subset of UEs 115 may be referred to as "enhanced" or "new"

UEs 115, while the second subset of UEs 115 may be referred to as "legacy" or "pre-Release 14" UEs 115. The enhanced UEs 115 may determine whether a signaled PRACH resource configuration supports the application of OCCs to RACH preambles, while the legacy UEs 115 may not be capable of making this determination, or may have such capabilities turned off. In some cases, a base station 105 serving both enhanced and legacy UEs 115 may not multiplex the two types of UEs 115. For example, legacy UEs 115 may not maintain phase continuity across multiple subframes 310, slots, or radio frames 305. In such cases, the base station 105 may not be able to multiplex these legacy UEs 115 with enhanced UEs 115 due to the phase discontinuity.

Figure 4:
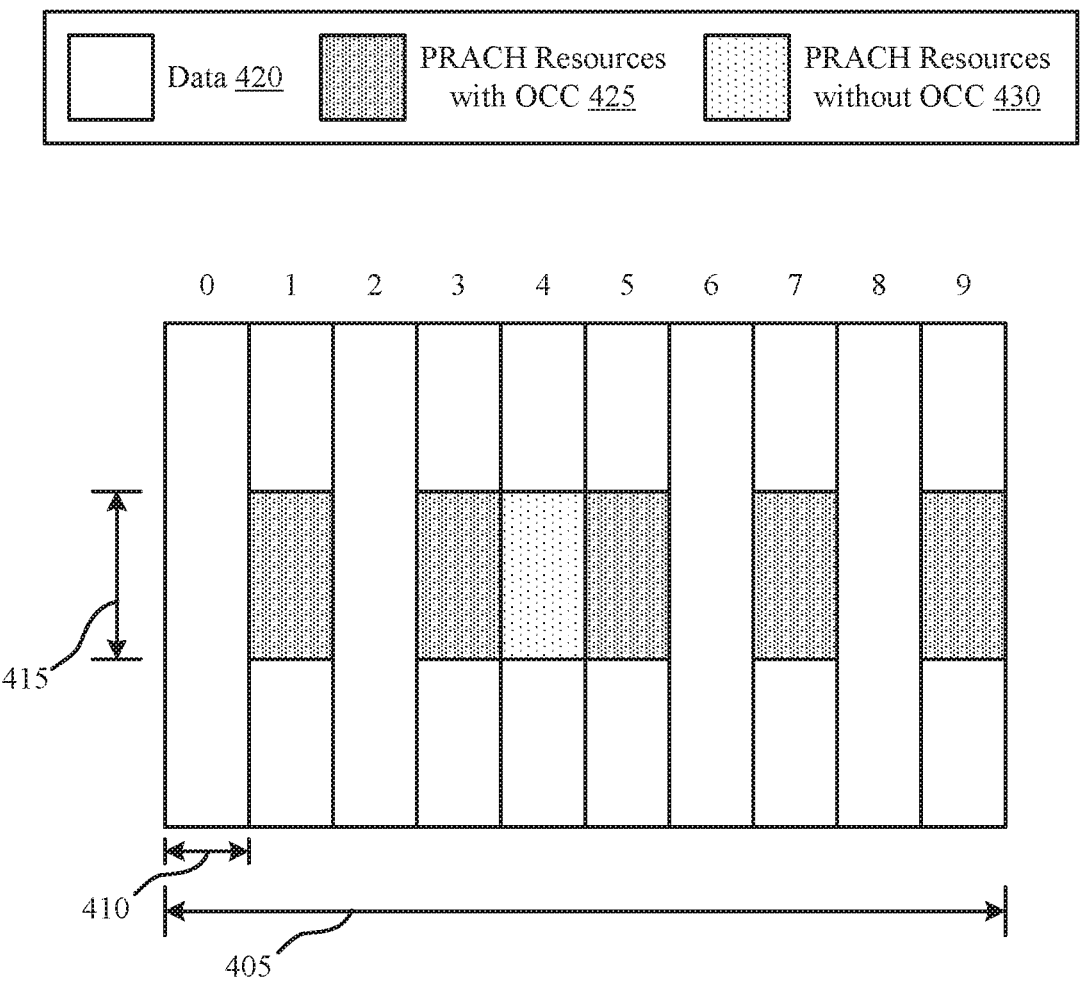

FIG. 4 illustrates an example of a resource grid 400 using "legacy" and "enhanced" resources that supports increasing PRACH capacity using OCCs in accordance with various aspects of the present disclosure. In some cases, legacy resources may be referred to as non-OCC resources, and enhanced resources may be referred to as OCC resources. Resource grid 400 may be an example of two sets of PRACH resources 425 and 430, which may correspond to legacy PRACH resource configurations or enhanced PRACH resource configurations. For example, as illustrated, resource grid 400 may include PRACH resources 425 corresponding to the legacy PRACH resource configuration with index 13, RACH preamble lengths of 1, and subframe numbers 1, 3, 5, 7, and 9. Resource grid 400 may additionally include PRACH resources 430 corresponding to the legacy PRACH resource configuration with index 4, RACH preamble lengths of 1, and subframe number 4. In some cases, PRACH resources 425 may support applying OCCs to repeated PRACH transmissions, while PRACH resources 430 may not support OCCs.

As illustrated, and similar to FIG. 3 as described above, resource grid 400 may span a radio frame 405, which includes 10 subframes 410. Resource grid 400 may include resources reserved for transmission of data 420 and PRACH resources 425 and 430 reserved for transmission of RACH messages. In some cases, the PRACH resources 425, 430, or both may be positioned within a certain frequency band 415. While two specific legacy PRACH resource configurations are illustrated by PRACH resources 425 and 430, the described methods and techniques may apply to many other legacy or non-legacy PRACH resource configurations.

In some cases, a wireless communications system, such as wireless communications systems 100 or 200 as described with reference to FIGS. 1 and 2, may support signaling of two sets of PRACH resources, one set of "legacy" PRACH resources 430, and one set of "enhanced" PRACH resources 425. In some cases, a base station 105 of the wireless communications system may always signal a first PRACH resource configuration for the set of legacy PRACH resources 430, and may determine whether or not to signal a second PRACH resource configuration for the set of enhanced PRACH resources 425, for example, based on traffic on the PRACH exceeding a threshold capacity. In other cases, the base station 105 may always signal both of the PRACH resource configurations. The base station 105 may signal the PRACH resource configurations in SIBs. The base station 105 may determine the first PRACH resource configuration for the set of legacy PRACH resources 430 and the second PRACH resource configuration for the set of enhanced PRACH resources 425, for example, based on a set configuration, a channel capacity, historical data, etc. In some cases, the set of possible PRACH resource configurations for the set of enhanced PRACH resources 425 may be limited based on one or more OCC applicability criteria, as described above with reference to FIG. 3. In some cases, the two sets of PRACH resources 425 and 430 may overlap in time, frequency, or both. In other cases, the base station 105 may determine set of PRACH resources 425 and 430 that do not overlap. Selecting non-overlapping PRACH resources may avoid possible phase discontinuities due to separated transmissions from legacy UEs 115.

An "enhanced" UE 115 may support transmitting RACH preamble repetitions using one or more OCCs in PRACH resources 425 designated for OCCs. The enhanced UE 115 may receive signals (e.g., a SIB) from the base station 105, and may identify both the set of legacy PRACH resources 430 not supporting OCCs and the set of enhanced PRACH resources 425 supporting OCCs. The enhanced UE 115 may select to transmit a RACH preamble message or a repeated RACH preamble message in either the enhanced PRACH resources 425 or the legacy PRACH resources 430.

In one aspect, the enhanced UE 115 may always select to transmit the RACH preamble in the enhanced PRACH resources 425 if the UE 115 detects or identifies configured enhanced PRACH resources 425. In this case, if a base station 105 signals legacy and enhanced PRACH resources, the base station 105 may receive RACH preamble transmissions from legacy UEs 115 in the legacy PRACH resources 430 and RACH preamble transmissions from enhanced UEs 115 in the enhanced PRACH resources 425 using OCCs. In a second aspect, the enhanced UE 115 may randomly or pseudo-randomly select between transmitting RACH preamble messages in the enhanced PRACH resources 425 or the legacy PRACH resources 430. In a third aspect, the enhanced UE 115 may randomly select between transmitting RACH preamble messages in the enhanced PRACH resources 425 or the legacy PRACH resources 430 based on a weight value. The enhanced UE 115 may store or determine the weight value for using either OCC or non-OCC resources. For example, a UE 115 with a weight value of 0.7 may select to transmit a RACH preamble message in the set of enhanced PRACH resources 425 70% of the time, and may transmit in the set of legacy PRACH resources 430 the remaining 30% of the time. The enhanced UE 115 may perform one of the selection processes described above for each new system access attempt or for each new base station 105.

If an enhanced UE 115 selects to transmit a RACH preamble message in the enhanced PRACH resources 425 using an OCC, the enhanced UE 115 may randomly or pseudo-randomly select a preamble and an OCC cover for transmission of the RACH preamble message. In some cases, the enhanced PRACH resources 425 may be associated with "enhanced services." For example, these enhanced services may include connection-less data transmission from the UE 115 to the base station 105. Connection-less data transmission may involve an enhanced UE 115 performing early data transmission in the enhanced PRACH resources 425 using an OCC. In such cases, enhanced UEs 115 or legacy UEs 115 may use the legacy PRACH resources 430 without OCCs for standard connection setup (e.g., radio resource control (RRC) connection) with the base station 105. In other cases, an enhanced UE 115 may utilize the enhanced PRACH resources 425 or a subset of the enhanced PRACH resources 425 and an OCC to transmit additional information (e.g., a payload size).

Figure 5:
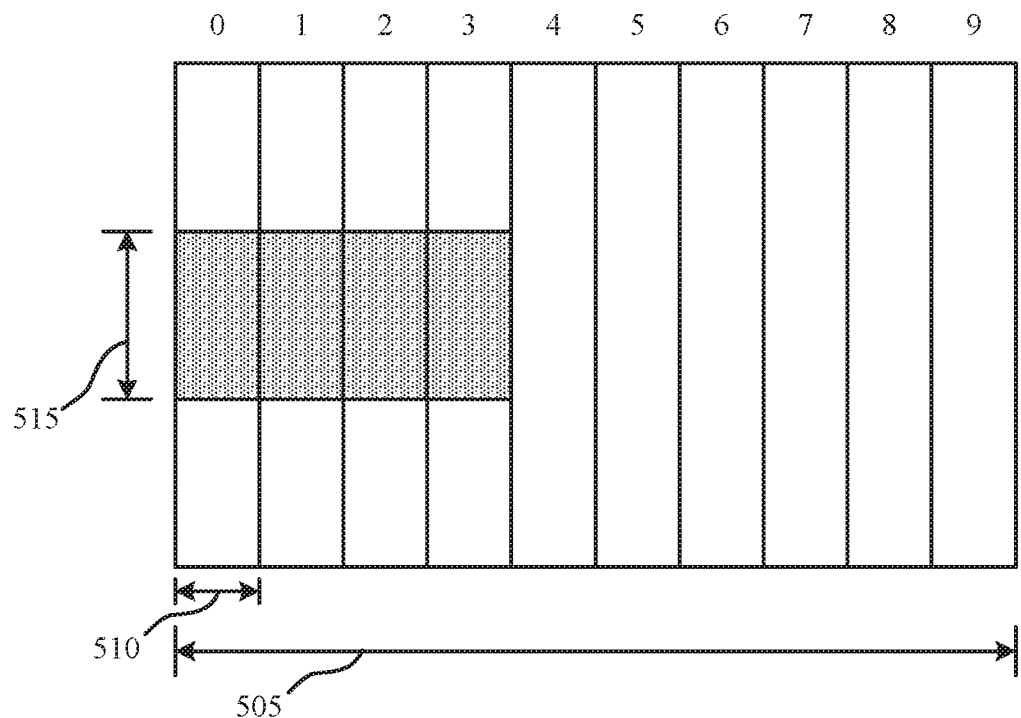

FIG. 5 illustrates an example of a resource grid 500 using a new PRACH configuration that supports increasing PRACH capacity using OCCs in accordance with various aspects of the present disclosure. Resource grid 500 may be an example of an "enhanced" PRACH resource configuration for efficiently supporting OCCs. For example, as illustrated, resource grid 500 may include PRACH resources 525 corresponding to an enhanced PRACH resource configuration with subframe lengths of 1 and subframe numbers 1, 2, 3, and 4. An enhanced UE 115 may transmit repeated RACH preamble messages in the enhanced PRACH resources 525 using OCCs.

As illustrated, and similar to FIGS. 3 and 4 as described above, resource grid 500 may span a radio frame 505, which includes 10 subframes 510. Resource grid 500 may include resources reserved for transmission of data 520 and PRACH OCC resources 525 reserved for transmission of RACH messages. In some cases, the PRACH OCC resources 525 may be positioned within a certain frequency band 515. While a specific enhanced PRACH resource configuration for OCCs is illustrated by enhanced PRACH resources 525, the described methods and techniques may apply to many other enhanced or non-legacy PRACH resource configurations.

In some cases, a wireless communications system, such as wireless communications systems 100 or 200 as described with reference to FIGS. 1 and 2, may support "enhanced" or "non-uniform" PRACH resource configurations. The enhanced PRACH resource configurations may be selected or designed to reduce latency in RACH repetitions and improve resistance to the Doppler effect and phase discontinuities. Oftentimes, legacy PRACH resource configurations may correspond to uniformly or near-uniformly spaced PRACH resources. Such a design may be efficient for single RACH preamble repetitions or to minimize delay for a given overhead. In contrast, an enhanced PRACH resource configuration may include concentrated PRACH OCC resources 525. For example, as illustrated, the PRACH resources 525 may be grouped together in a contiguous subset of subframes 510, followed or preceded by a gap before another set of concentrated PRACH resources in a subsequent radio frame 505. Other examples of enhanced PRACH resource configurations may not include contiguous resources, but may include uneven spacing between PRACH resources 525, so that a UE 115 may have less time to wait in between RACH repetition transmissions. Grouping the RACH repetitions may also improve orthogonality by mitigating phase discontinuities.

In some examples, mapping of an enhanced PRACH resource configuration to subframes 510 may be based on the number of RACH preamble message repetitions to transmit. For example, a PRACH resource configuration with index 0 may have an overhead of 5% (1 subframe in every other frame). If a UE 115 is configured to transmit four RACH preamble repetitions, an enhanced RACH resource configuration may specify RACH transmission in subframes 0, 1, 2, and 3, as illustrated in FIG. 5. However, to maintain a same overhead while introducing an OCC of length four, the subframes 510 for RACH transmission may occur only once every eight radio frames 505. Additionally or alternatively, the mapping may be based on the PRACH format used. For example, a PRACH preamble or format associated with RACH transmissions two subframes in length may specify RACH transmission in subframes 0, 2, 4, and 6 to account for the longer RACH preamble messages, and may maintain the same OCC of length four and one-out-of-eight radio frame 505 frequency.

Figure 6:
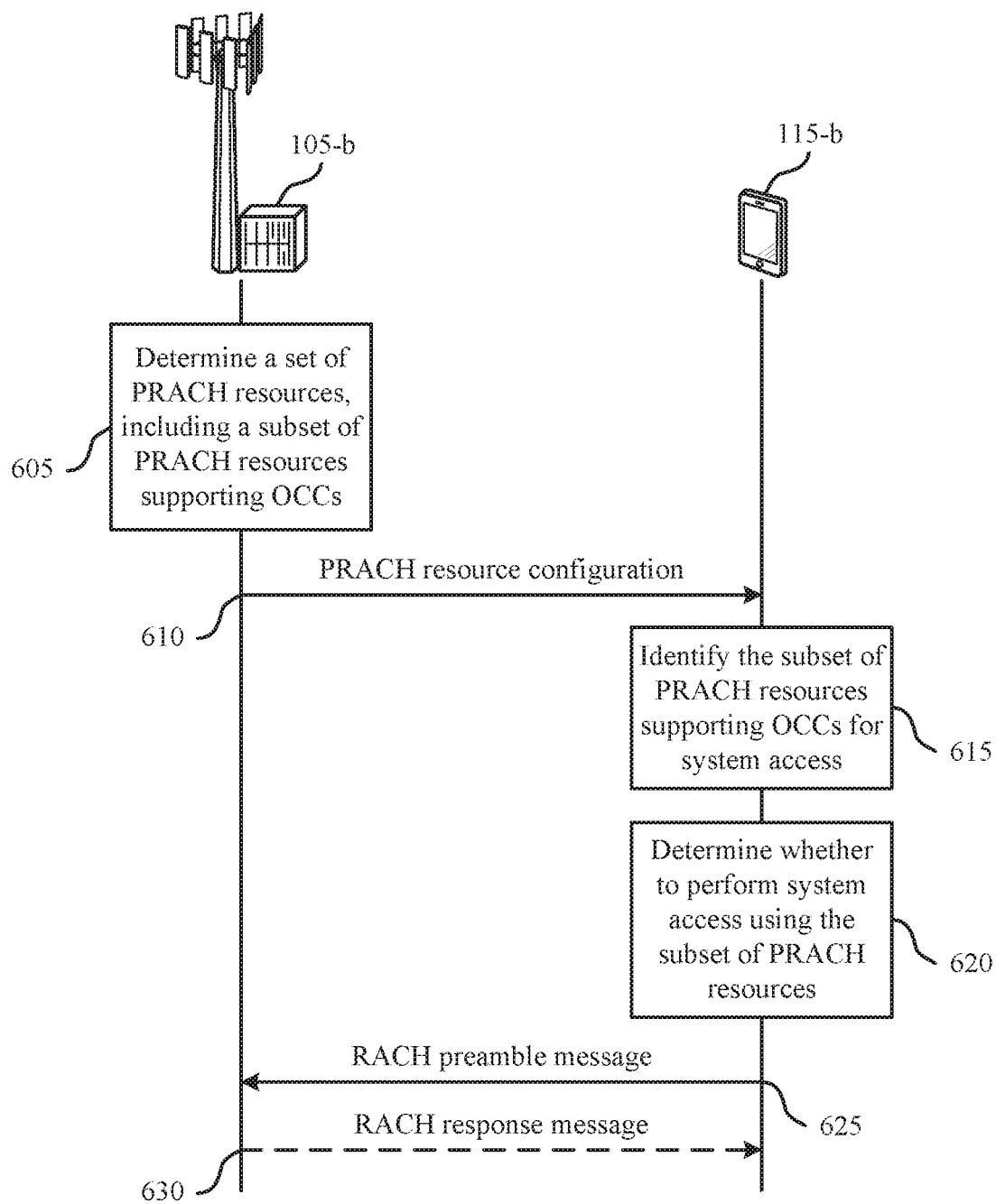
FIG. 6 illustrates an example of a process flow that supports increasing PRACH capacity using OCCs in accordance with aspects of the present disclosure.

FIG. 6 illustrates an example of a process flow 600 that supports increasing PRACH capacity using OCCs in accordance with various aspects of the present disclosure. The process flow 600 may include base station 105-b and UE 115-b, which may be examples of a base station 105 or a UE 115, as described with reference to FIGS. 1 and 2. Base station 105-b and UE 115-b may operate in a wireless communications system that supports PRACH configurations for OCCs.

At 605, base station 105-b may determine a set of PRACH resources, including a subset of PRACH resources for performing system access using OCCs for random access. Additionally, in some cases, the set of PRACH resources may include a second subset of PRACH resources not configured to support OCCs. In some cases, base station 105-b may determine the PRACH resources based on identifying or generating one or more PRACH resource configurations.

At 610, base station 105-b may transmit one or more PRACH resource configurations indicating the set of PRACH resources. For example, base station 105-b may transmit an indication of the PRACH resource configurations in a SIB. In some cases, base station 105-b may signal a single PRACH resource configuration that may be used for "enhanced" operations (i.e., with OCCs), "legacy" operations (i.e., without OCCs), or both. In other cases, base station 105-b may signal multiple PRACH resource configurations, where one or more of the PRACH resource configurations may be used for the enhanced operations, and one or more other PRACH resource configurations may be used for legacy operations. One or more UEs 115, such as UE 115-b, may detect the transmission, and may receive the signal indicating the one or more PRACH resource configurations.

At 615, UE 115-b may identify the subset of the set of PRACH resources supporting OCCs for system access based on a PRACH resource configuration. In some cases, UE 115-b may additionally identify the second subset of PRACH resources not configured to support OCCs. UE 115-b may determine whether PRACH resources support OCCs based on the corresponding PRACH resource configuration. In some cases, UE 115-b may include an indication (e.g., in a table stored in memory) of PRACH resource configurations that support OCCs, PRACH resource configurations that do not support OCCs, or both. In other cases, UE 115-b may determine if a PRACH resource configuration supports OCCs based on signaling from base station 105-b (e.g., in the SIB). In yet other cases, UE 115-b may determine if a PRACH resource configuration supports OCCs based on the timing of RACH preamble message repetitions in PRACH resources based on the PRACH resource configuration. In order to identify the PRACH resources supporting OCCs, UE 115-b may be an example of an enhanced UE 115. Legacy UEs 115 may not be configured to identify enhanced PRACH resources supporting OCCs.

At 620, UE 115-b may determine whether to perform system access on the cell for base station 105-b using the subset of PRACH resources supporting OCCs. In some cases, UE 115-b may be configured to use PRACH resources supporting OCCs for system access whenever UE 115-b detects these enhanced resources. In other cases, UE 115-b may be configured to randomly or pseudo-randomly select between using enhanced PRACH resources or legacy PRACH resources. In some examples, UE 115-b may make the random selection based on a weighted proportion or weight value. In yet other cases, UE 115-b may determine whether to apply an OCC to a RACH preamble based on the type of transmission. For example, for standard RRC system access with base station 105-b, UE 115-b may select legacy PRACH resources not supporting OCCs. However, for connection-less data transmission to base station 105-*b*, UE 115-*b* may select enhanced PRACH resources supporting OCCs.

At 625, UE 115-*b* may transmit a RACH preamble message for system access to base station 105-*b* based on the determined or selected PRACH resources. For example, UE 115-*b* may either transmit the RACH preamble message and its repetitions using an OCC in enhanced PRACH resources, or transmit the RACH preamble message and its repetitions without an OCC in legacy PRACH resources. Base station 105-*b* may monitor the PRACH resources signaled at 610 for any RACH messages. Base station 105-*b* may detect and receive the RACH preamble message from UE 115-*b* over the PRACH resources.

In some cases, base station 105-*b* may determine a preamble index for the received RACH preamble message. At 630, base station 105-*b* may transmit a RACH preamble response message to UE 115-*b* in response to the RACH preamble message. Base station 105-*b* may include, in the RACH preamble response, a RACH preamble identifier, such as the preamble index, an RNTI, an OCC index used by UE 115-*b* for transmitting the RACH preamble message, or some combination of these. UE 115-*b* may receive and decode at least a portion of the RACH preamble response message, and may identify that the RACH preamble response message corresponds to the RACH preamble message transmitted by UE 115-*b* at 625 based on the preamble index, RNTI, OCC index, or some combination of these. UE 115-*b* and base station 105-*b* may continue the random access procedure based on the interchange of these RACH messages at 625 and 630.

Figure 7:
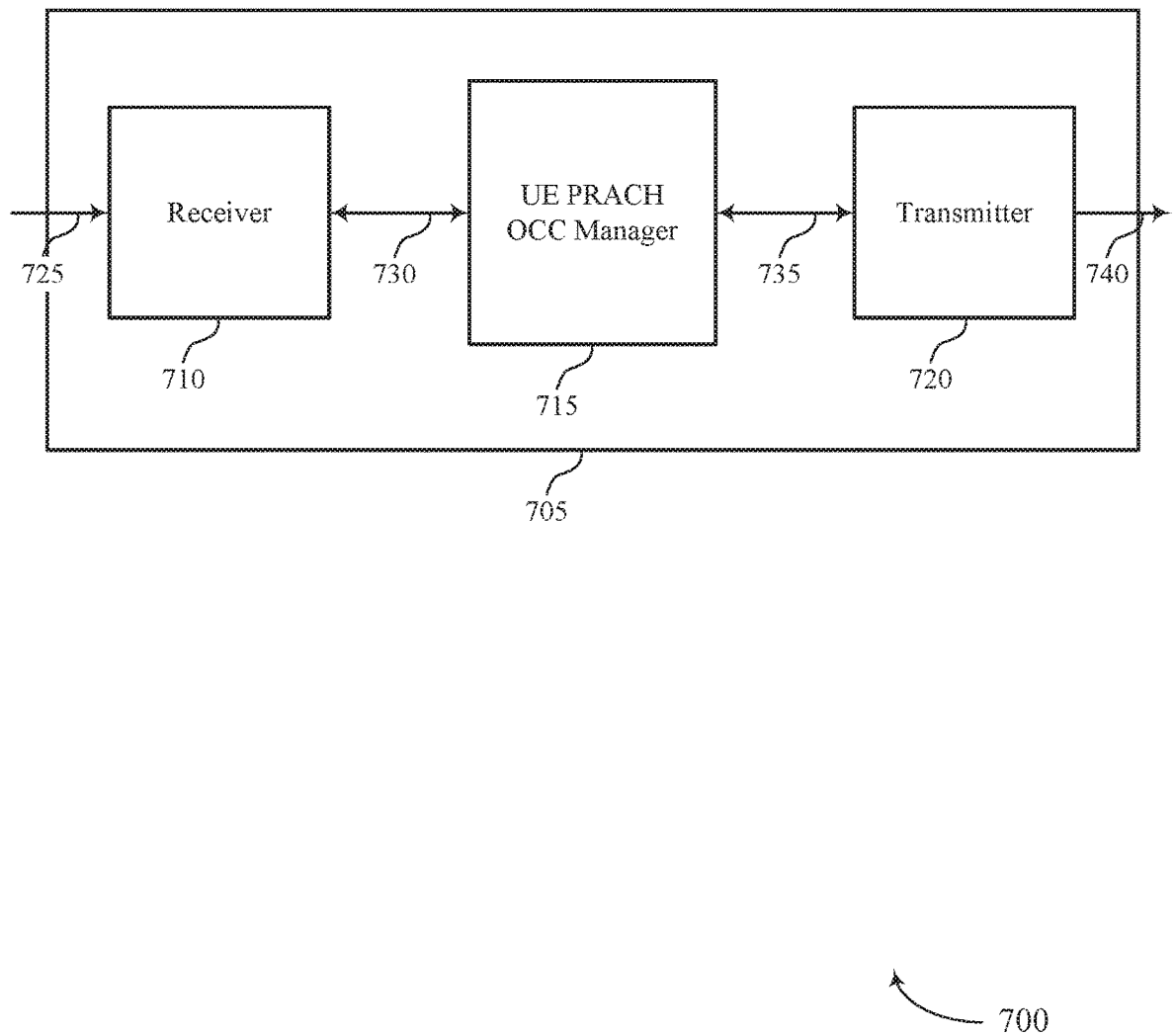
FIGS. 7 through 9 show block diagrams of a device that supports increasing PRACH capacity using OCCs in accordance with aspects of the present disclosure.

FIG. 7 shows a block diagram 700 of a wireless device 705 that supports increasing physical random access capacity using orthogonal cover codes in accordance with aspects of the present disclosure. Wireless device 705 may be an example of aspects of a UE 115 as described herein. Wireless device 705 may include receiver 710, UE PRACH OCC manager 715, and transmitter 720. Wireless device 705 may also include a processor. Each of these components may be in communication with one another (e.g., via one or more buses).

Receiver 710 may receive information 725, such as packets, user data, or control information associated with various information channels (e.g., control channels, data channels, and information related to increasing physical random access capacity using orthogonal cover codes, etc.). For example, receiver 710 may demodulate signals received over monitored time-frequency resources, and may decode the demodulated signals to obtain bits that indicate the information 725. Receiver 710 may then pass this information, as information 730, on to other components of the device. The receiver 710 may be an example of aspects of the transceiver 1035 described with reference to FIG. 10. The receiver 710 may utilize a single antenna or a set of antennas.

UE PRACH OCC manager 715 may be an example of aspects of the UE PRACH OCC module 1015 described with reference to FIG. 10. UE PRACH OCC manager 715 and/or at least some of its various sub-components may be implemented in hardware, software executed by a processor, firmware, or any combination thereof. If implemented in software executed by a processor, the functions of the UE PRACH OCC manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE PRACH OCC manager 715 and/or at least some of its various sub-components may be physically located at various positions, including being distributed such that portions of functions are implemented at different physical locations by one or more physical devices. In some examples, UE PRACH OCC manager 715 and/or at least some of its various sub-components may be a separate and distinct component in accordance with various aspects of the present disclosure. In other examples, UE PRACH OCC manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE PRACH OCC manager 715 may receive a PRACH resource configuration indicating a set of PRACH resources for a cell. For example, UE PRACH OCC module 715 may receive the PRACH resource configuration from receiver 710 in information 730. UE PRACH OCC manager 715 may identify, from the set of PRACH resources, a subset of PRACH resources for performing system access using OCCs, determine whether to perform system access on the cell using the subset of PRACH resources, and transmit a random access preamble message for the system access based on the determining. For transmitting, UE PRACH OCC manager 715 may send the random access preamble message 735 to transmitter 720 for transmission.

Transmitter 720 may transmit signals 740 generated by other components of the device. For example, transmitter 720 may encode random access preamble message 735, identify time-frequency resources over which the random access preamble message is to be transmitted, and modulate the transmission over the identified time-frequency resources. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
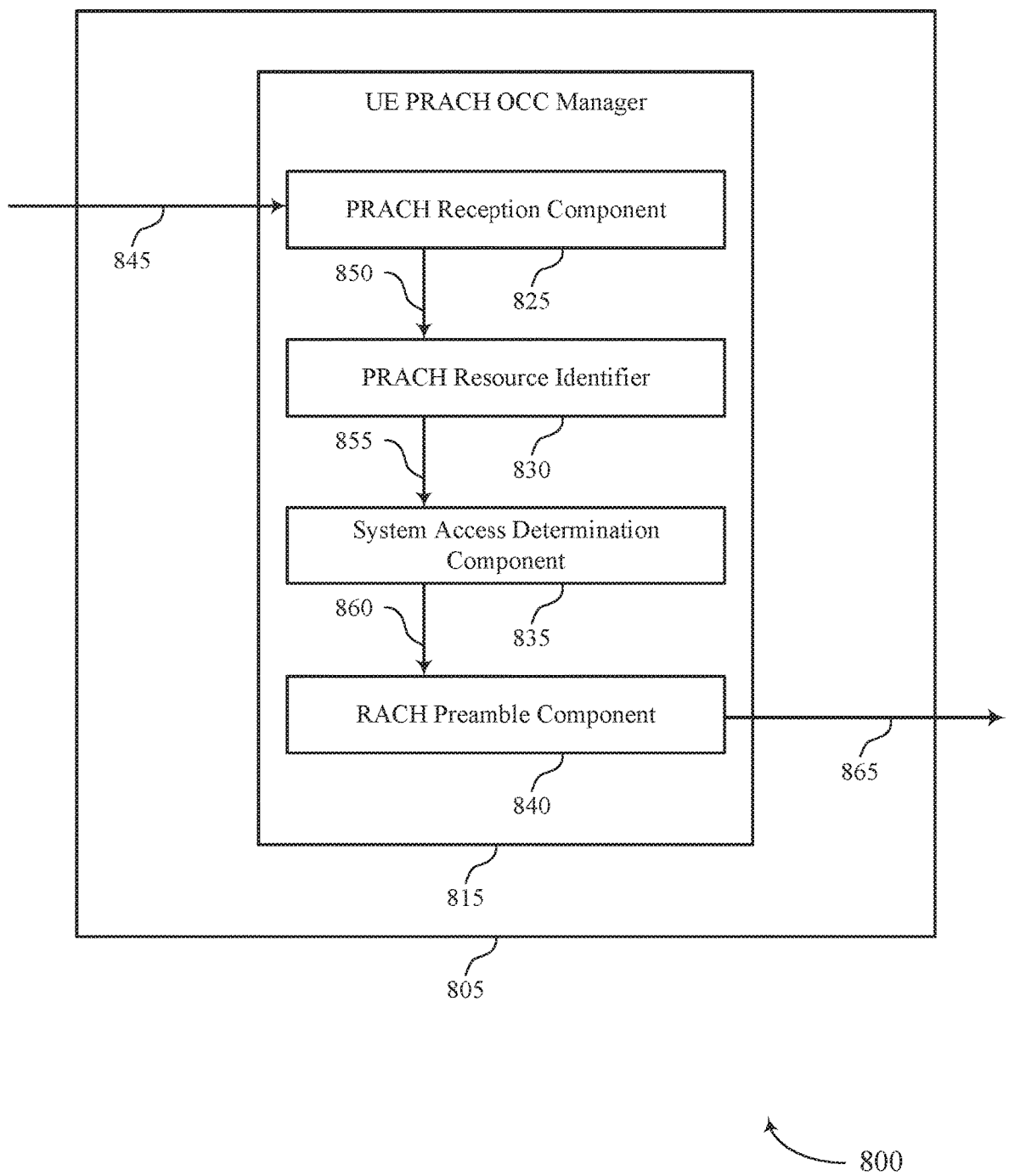

FIG. 8 shows a block diagram 800 of a wireless device 805 that supports increasing physical random access capacity using orthogonal cover codes in accordance with aspects of the present disclosure. Wireless device 805 may be an example of aspects of a wireless device 705 or a UE 115 as described with reference to FIG. 7. Wireless device 805 may include a receiver, UE PRACH OCC manager 815, and a transmitter. In some cases, the receiver and transmitter may be components of UE PRACH OCC manager 815. Wireless device 805 may also include a processor. Each of these components may be in communication with one another (e.g., via one or more buses).

A receiver may receive information such as packets, user data, or control information associated with various information channels (e.g., control channels, data channels, and information related to increasing physical random access capacity using orthogonal cover codes, etc.). Information may be passed on to other components of the device. The receiver may be an example of receiver 710 of FIG. 7, or aspects of the transceiver 1035 described with reference to FIG. 10. The receiver may utilize a single antenna or a set of antennas.

UE PRACH OCC manager 815 may be an example of aspects of the UE PRACH OCC manager 1015 described with reference to FIG. 10. UE PRACH OCC manager 815 may also include PRACH reception component 825, PRACH resource identifier 830, system access determination component 835, and RACH preamble component 840.

PRACH reception component 825 may receive a PRACH resource configuration indicating a set of PRACH resources for a cell. For example, PRACH reception component 825 or a receiver may receive a signal 845, and may demodulate and decode the signal to determine the PRACH resource configuration. In some cases, the PRACH resource configuration includes an OCC PRACH resource configuration. PRACH reception component 825 may send the PRACH resource configuration 850 to PRACH resource identifier 830.

PRACH resource identifier 830 may identify a subset of PRACH resources for performing system access using OCCs, for example, based on the PRACH resource configuration 850. In some cases, PRACH resource identifier 830 may identify, from the set of PRACH resources, a second subset of PRACH resources not configured for supporting OCCs. In some cases, the second subset of PRACH resources may include a set of distributed resources that are separated in the time domain by an equal number of subframes or separated in the time domain by either a first number of subframes or a second number of subframes differing from the first number by one subframe. In contrast, in some cases, the subset of PRACH resources may include a set of PRACH resources that are contiguous or separated in a time domain by less than a repetition separation time threshold. In some cases, the set of PRACH resources spans a length of time greater than or equal to an OCC length for the random access preamble message. In some cases, the subset of PRACH resources and the second subset of the set of PRACH resources overlap. PRACH resource identifier 830 may send an identified subset of PRACH resources supporting OCCs 855 to system access determination component 835.

System access determination component 835 may perform system access on the cell using the subset of the set of PRACH resources 855. In some cases, determining whether to perform system access on the cell using the subset of the set of PRACH resources is based on a transmission type associated with the system access. In some cases, the transmission type includes a first type of system access for RRC connection or a second type of system access for connection-less data transmission. System access determination component 835 may send a determined set of PRACH resources for system access 860 to RACH preamble component 840.

RACH preamble component 840 or a transmitter may transmit a random access preamble message 865 for the system access based on the determined set of PRACH resources for system access 860. In some cases, RACH preamble component 840 may select, for the random access preamble message, a random preamble, a random OCC cover, or both. RACH preamble component 840 or the transmitter may transmit random access preamble message 865, identify time-frequency resources over which the random access preamble message is to be transmitted, and modulate the transmission over the identified time-frequency resources.

In some cases, some or all of the functionality described above with respect to RACH preamble component 840 may be performed by a transmitter. For example, the transmitter may transmit random access preamble message 865 generated by other components of the device. In some examples, the transmitter may be collocated with a receiver in a transceiver module. For example, the transmitter may be an example of aspects of the transceiver 1035 described with reference to FIG. 10. The transmitter may utilize a single antenna or a set of antennas.

Figure 9:
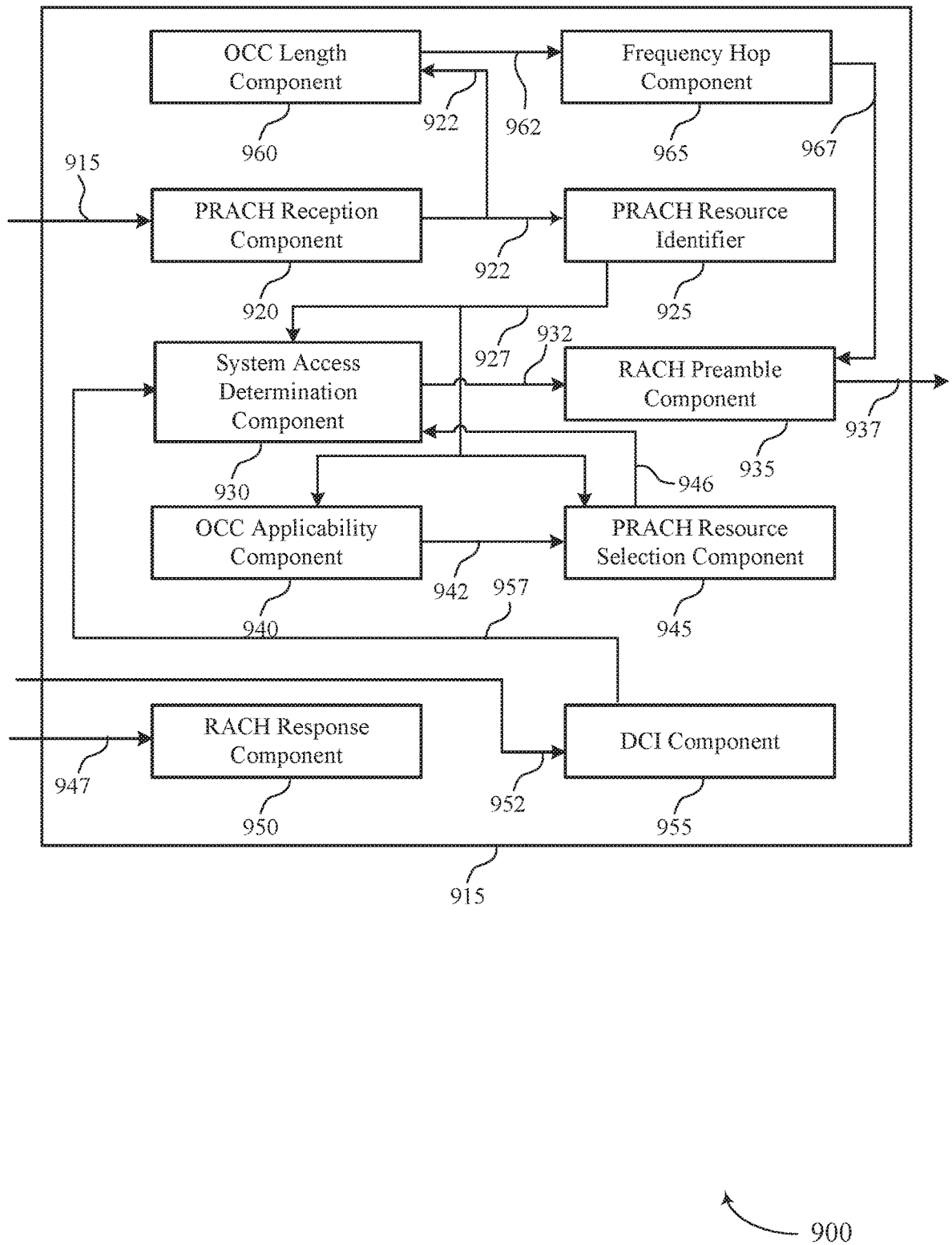

FIG. 9 shows a block diagram 900 of a UE PRACH OCC manager 915 that supports increasing physical random access capacity using orthogonal cover codes in accordance with aspects of the present disclosure. The UE PRACH OCC manager 915 may be an example of aspects of a UE PRACH OCC manager 715, a UE PRACH OCC manager 815, or a UE PRACH OCC manager 1015 described with reference to FIGS. 7, 8, and 10. The UE PRACH OCC manager 915 may include PRACH reception component 920, PRACH resource identifier 925, system access determination component 930, RACH preamble component 935, OCC applicability component 940, PRACH resource selection component 945, RACH response component 950, DCI component 955, OCC length component 960, and frequency hop component 965. Each of these modules may communicate, directly or indirectly, with one another (e.g., via one or more buses).

PRACH reception component 920 may receive a PRACH resource configuration indicating a set of PRACH resources for a cell. For example, PRACH reception component 920 may receive a signal 915, and may demodulate and decode the signal 915 to determine PRACH resource configuration. PRACH reception component 920 may pass the PRACH resource configuration 922 to the PRACH resource identifier 925 or the OCC length component 960. In some cases, the PRACH resource configuration includes an OCC PRACH resource configuration.

PRACH resource identifier 925 may identify, from the set of PRACH resources, a subset of PRACH resources for performing system access using OCCs, for example, based on the PRACH resource configuration 922. In some cases, PRACH resource identifier 925 may identify, from the set of PRACH resources, a second subset of PRACH resources not configured for supporting OCCs. In some cases, the second subset of the set of PRACH resources may include a set of distributed resources that are separated in the time domain by an equal number of subframes or separated in the time domain by either a first number of subframes or a second number of subframes differing from the first number by one subframe. In some cases, the subset of PRACH resources includes a set of PRACH resources that are contiguous or separated in a time domain by less than a repetition separation time threshold, where the set of PRACH resources may span a length of time greater than or equal to an OCC length for the random access preamble message. In some cases, the subset of PRACH resources and the second subset of PRACH resources overlap. The PRACH resource identifier 925 may pass the subset of PRACH resources 927 to the system access determination component 930, the OCC applicability component 940, or the PRACH resource selection component 945.

System access determination component 930 may receive the subset of PRACH resources 927 and determine whether to perform system access on the cell using the subset of PRACH resources 927. In some cases, performing system access on the cell using the subset of PRACH resources is based on a transmission type associated with the system access. In some cases, the transmission type includes a first type of system access for RRC connection or a second type of system access for connection-less data transmission. System access determination component 930 may send a determined set of PRACH resources for system access 932 to RACH preamble component 935.

RACH preamble component 935 may receive the determined set of PRACH resources for system access 932 and transmit a random access preamble message 937 for the system access based on the determined set of PRACH resources for system access 932. In some cases, RACH preamble component 935 may select, for the random access preamble message, a random preamble, a random OCC cover, or both. RACH preamble component 935 may transmit random access preamble message 937, identify time-frequency resources over which the random access preamble message is to be transmitted, and modulate the transmission over the identified time-frequency resources.

OCC applicability component 940 may receive the subset of PRACH resources 927 and identify an OCC applicability criteria associated with supporting OCCs for the set of PRACH resources 927. In some cases, OCC applicability component 940 may determine that the PRACH resource configuration supports OCCs based on the set of PRACH resources and the OCC applicability criteria. In some cases, the PRACH resource configuration includes a number of contiguous PRACH transmission opportunities greater than or equal to an OCC length. In some cases, the OCC applicability criteria includes a repetition separation time threshold, where the PRACH resource configuration includes PRACH transmission opportunities separated in a time domain by a length of time less than the repetition separation time threshold. OCC applicability component 940 may send OCC applicability 942 to PRACH resource selection component 945.

PRACH resource selection component 945 may receive the subset of PRACH resources 927 or the OCC applicability 942 and determine to perform system access on the cell using the subset of PRACH resources 927 based on OCC applicability 942. In other cases, PRACH resource selection component 945 may select between the subset of PRACH resources and the second subset of PRACH resources using a random or pseudo-random process. PRACH resource selection component 945 may identify a weight value associated with selecting either the subset of PRACH resources or the second subset of PRACH resources, where selecting between the subset of PRACH resources and the second subset of PRACH resources is based on the weight value. PRACH resource selection component 945 may send PRACH resource selection 946 to the system access determination component 930, which may use PRACH resource selection 946 in determining the PRACH resources for system access 932.

RACH response component 950 may receive a random access response message 947 in response to the random access preamble message. In some cases, RACH response component 950 may identify the random access response message 947 based on a random access preamble identifier of the random access response message, a random access RNTI of the random access response message, an OCC index included in the random access response message, or a combination thereof.

DCI component 955 may receive a DCI transmission 952 including an OCC index, a random access preamble, or both, where determining whether to perform system access on the cell using the subset PRACH resources is based on the DCI transmission. Information relating to the determination whether to perform system access on the cell may be transferred to system access determination component 930 via determination information 957.

OCC length component 960 may determine an OCC length for the system access based on a received PRACH resource configuration 922 and pass the OCC length 962 to the frequency hop component 965.

Frequency hop component 965 may determine a frequency hopping pattern for transmitting a random access preamble message, where the frequency hopping is based on the OCC length 962 for the system access. The frequency hop component 965 may pass the frequency hop pattern 967 to the RACH preamble component 935, which may use the frequency hop patter 967 in transmitting the random access preamble message 937.

Figure 10:
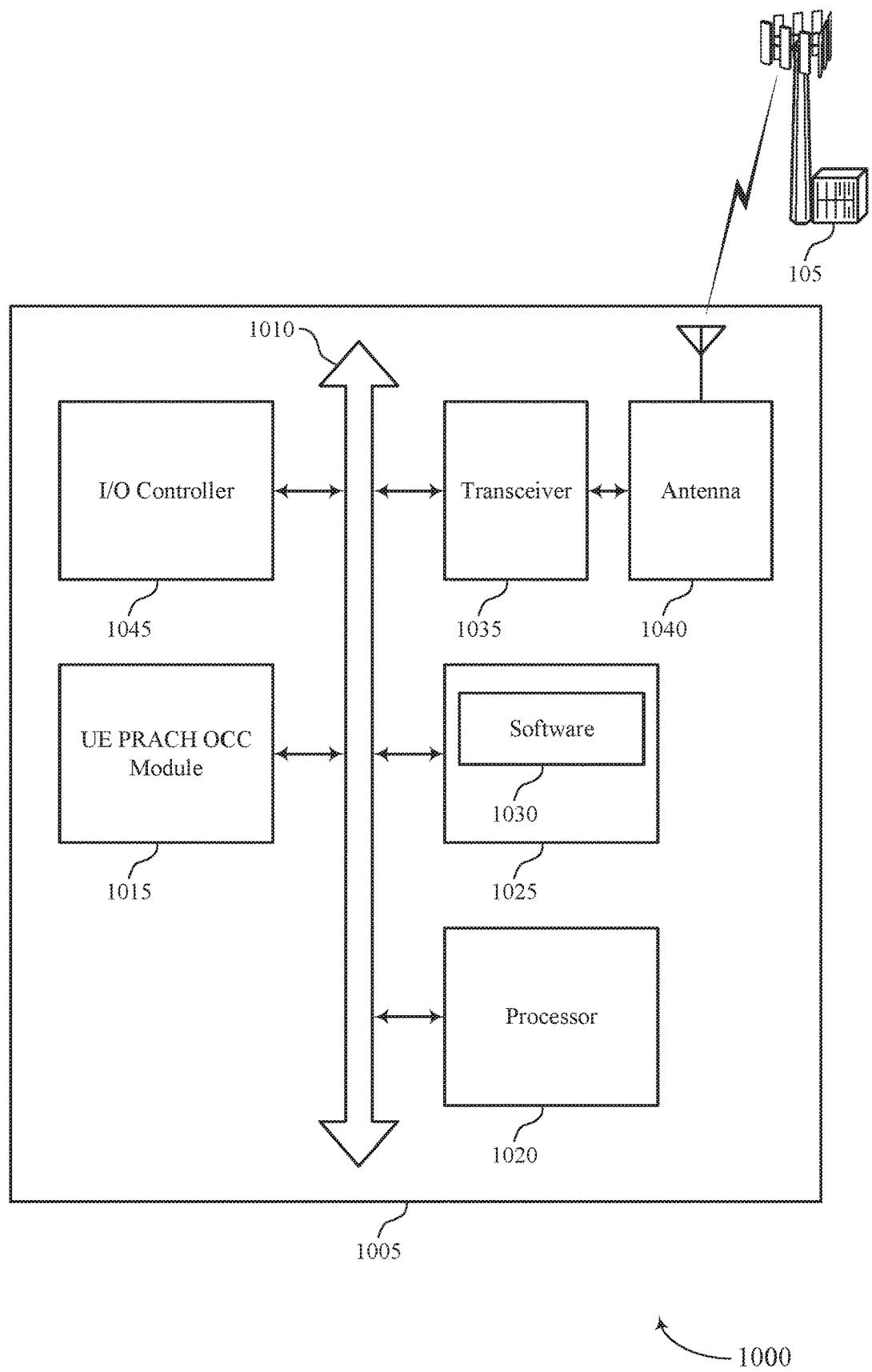
FIG. 10 illustrates a block diagram of a system including a UE that supports increasing PRACH capacity using OCCs in accordance with aspects of the present disclosure.

FIG. 10 shows a diagram of a system 1000 including a device 1005 that supports increasing physical random access capacity using orthogonal cover codes in accordance with aspects of the present disclosure. Device 1005 may be an example of or include the components of wireless device 705, wireless device 805, or a UE 115 as described above, e.g., with reference to FIGS. 1, 2, 7, and 8. Device 1005 may include components for bi-directional voice and data communications including components for transmitting and receiving communications, including UE PRACH OCC module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting increasing physical random access capacity using orthogonal cover codes).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support increasing physical random access capacity using orthogonal cover codes. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
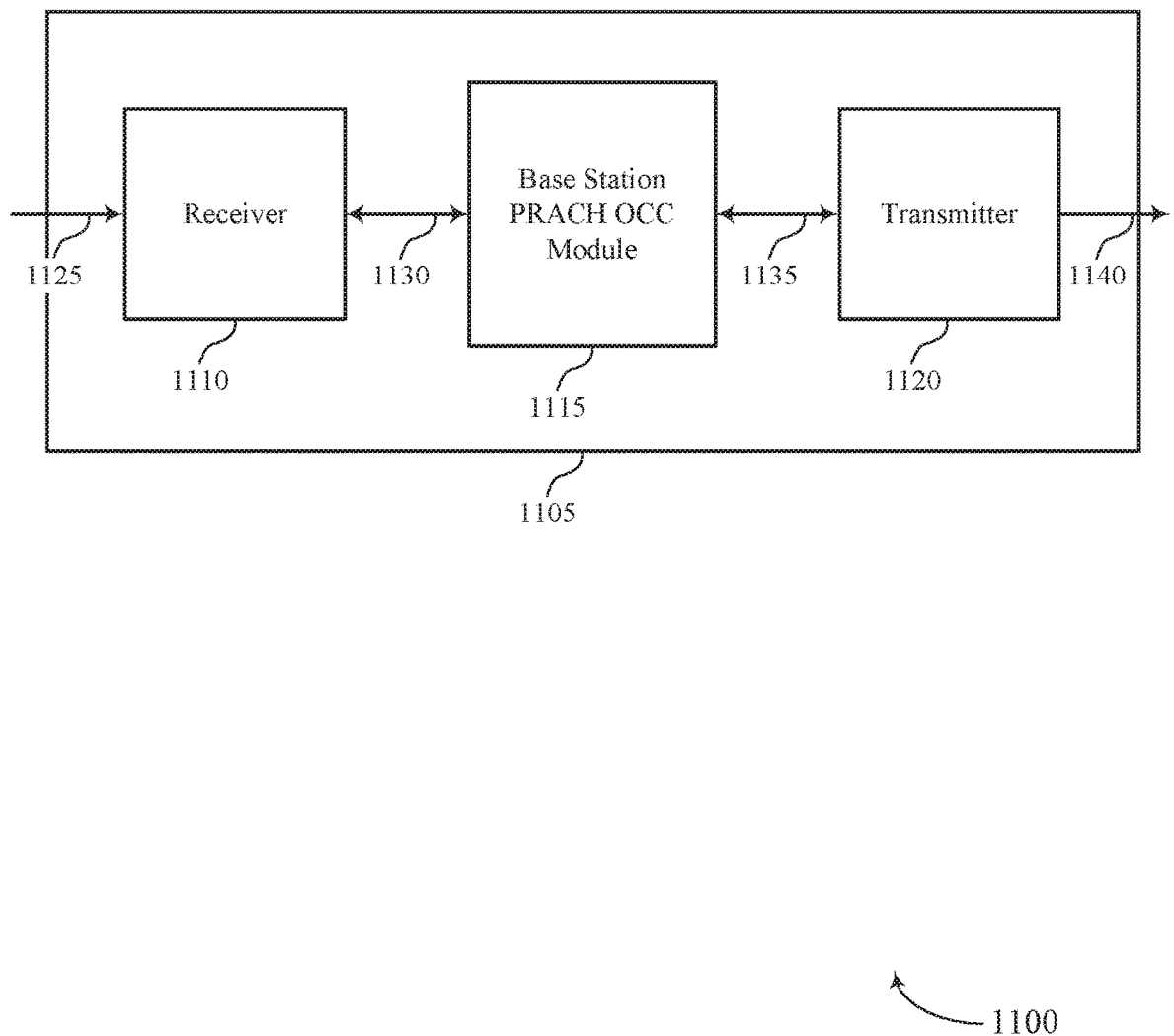
FIGS. 11 through 13 show block diagrams of a device that supports increasing PRACH capacity using OCCs in accordance with aspects of the present disclosure.

FIG. 11 shows a block diagram 1100 of a wireless device 1105 that supports increasing physical random access capacity using orthogonal cover codes in accordance with aspects of the present disclosure. Wireless device 1105 may be an example of aspects of a base station 105 as described herein. Wireless device 1105 may include receiver 1110, base station PRACH OCC module 1115, and transmitter 1120. Wireless device 1105 may also include a processor. Each of these components may be in communication with one another (e.g., via one or more buses).

Receiver 1110 may receive information 1125 such as packets, user data, or control information associated with various information channels (e.g., control channels, data channels, and information related to increasing physical random access capacity using orthogonal cover codes, etc.). For example, receiver 1110 may demodulate signals received over monitored time-frequency resources, and may decode the demodulated signals to obtain bits that indicate the information 1125. Receiver 1110 may then pass this information, as information 1130, on to other components of the device. The receiver 1110 may be an example of aspects of the transceiver 1435 described with reference to FIG. 14. The receiver 1110 may utilize a single antenna or a set of antennas.

Base station PRACH OCC module 1115 may be an example of aspects of the base station PRACH OCC module 1415 described with reference to FIG. 14. Base station PRACH OCC module 1115 and/or at least some of its various sub-components may be implemented in hardware, software executed by a processor, firmware, or any combination thereof. If implemented in software executed by a processor, the functions of the base station PRACH OCC module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station PRACH OCC module 1115 and/or at least some of its various sub-components may be physically located at various positions, including being distributed such that portions of functions are implemented at different physical locations by one or more physical devices. In some examples, base station PRACH OCC module 1115 and/or at least some of its various sub-components may be a separate and distinct component in accordance with various aspects of the present disclosure. In other examples, base station PRACH OCC module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station PRACH OCC module 1115 may determine a set of PRACH resources, the set of PRACH resources including a subset of PRACH resources for performing system access using OCCs for random access, and may transmit a PRACH resource configuration 1135, the PRACH resource configuration 1135 indicating the set of PRACH resources and the subset of PRACH resources. For example, base station PRACH OCC module 1115 may send PRACH resource configuration 1135 to transmitter 1120 for transmission, where PRACH resource configuration 1135. Base station PRACH OCC module 1115 may receive a random access preamble message 1130 for the system access in the set of PRACH resources. For example, receiver 1110 may receive the random access preamble message as information 1125, and may pass this information to base station PRACH OCC module 1115 as random access preamble message 1130.

Transmitter 1120 may transmit PRACH resource configuration 1140 generated by other components of the device. For example, transmitter 1120 may encode PRACH resource configuration 1135, identify time-frequency resources over which the PRACH resource configuration is to be transmitted, and modulate the transmission over the identified time-frequency resources. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
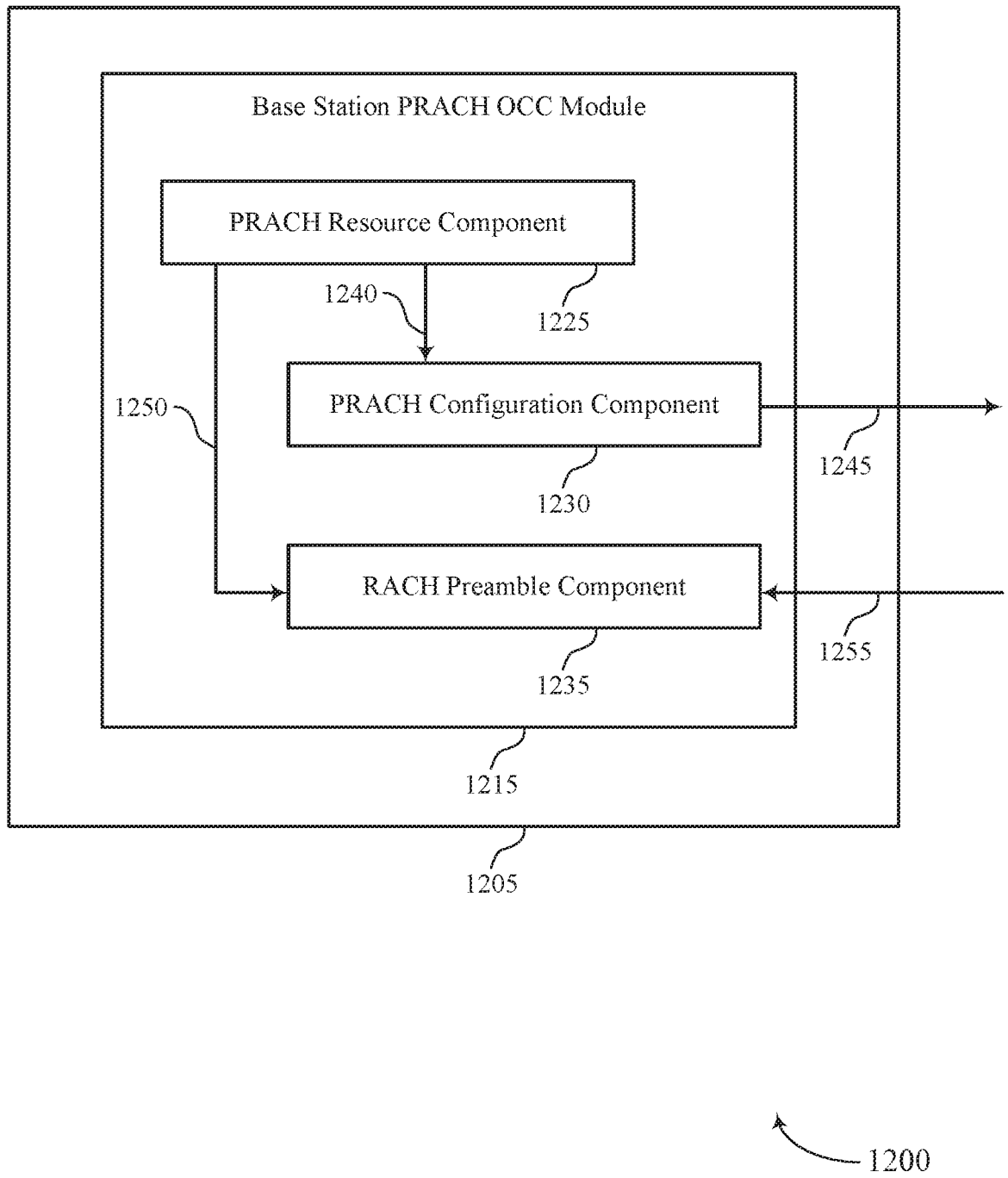

FIG. 12 shows a block diagram 1200 of a wireless device 1205 that supports increasing physical random access capacity using orthogonal cover codes in accordance with aspects of the present disclosure. Wireless device 1205 may be an example of aspects of a wireless device 1105 or a base station 105 as described with reference to FIG. 11. Wireless device 1205 may include a receiver, base station PRACH OCC module 1215, and a transmitter. In some cases, the receiver and/or transmitter may be examples of components of base station PRACH OCC module 1215. Wireless device 1205 may also include a processor. Each of these components may be in communication with one another (e.g., via one or more buses).

A receiver may receive information such as packets, user data, or control information associated with various information channels (e.g., control channels, data channels, and information related to increasing physical random access capacity using orthogonal cover codes, etc.). Information may be passed on to other components of the device. The receiver may be an example of aspects of the transceiver 1435 described with reference to FIG. 14. The receiver may utilize a single antenna or a set of antennas.

Base station PRACH OCC module 1215 may be an example of aspects of the base station PRACH OCC module 1415 described with reference to FIG. 14. Base station PRACH OCC module 1215 may also include PRACH resource component 1225, PRACH configuration component 1230, and RACH preamble component 1235.

PRACH resource component 1225 may determine a set of PRACH resources, the set of PRACH resources including a subset of PRACH resources for performing system access using OCCs for random access. In some cases, the set of PRACH resources includes a second subset of PRACH resources, from the set of PRACH resources, not configured for supporting OCCs. In some cases, the subset of PRACH resources includes a set of PRACH resources that are contiguous or separated in a time domain by less than a repetition separation time threshold. In some cases, the set of concentrated PRACH resources spans a length of time greater than or equal to an OCC length. PRACH resource component 1225 may send an indication of the determined PRACH resources to PRACH configuration component 1230 and RACH preamble component 1235, for example, as PRACH resources 1240 and PRACH resources 1250, respectively.

PRACH configuration component 1230 or a transmitter may transmit a PRACH resource configuration 1245 indicating the set of PRACH resources and the subset of PRACH resources. For example, PRACH configuration component 1230 may determine the PRACH resource configuration based on the received PRACH resources 1240. PRACH configuration component 1230 or the transmitter may identify time-frequency resources over which the PRACH resource configuration is to be transmitted and modulate the transmission over the identified time-frequency resources. For example, the transmitted signal 1245 may indicate the PRACH resource configuration. In some cases, the PRACH resource configuration includes a number of contiguous PRACH transmission opportunities greater than or equal to an OCC length. In some cases, the PRACH resource configuration includes PRACH transmission opportunities separated in a time domain by a length of time less than a repetition separation time threshold. In some cases, the PRACH resource configuration includes an OCC PRACH resource configuration.

RACH preamble component 1235 or a receiver may receive a random access preamble message for the system access in the set of PRACH resources. For example, RACH preamble component 1235 or the receiver may monitor time-frequency resources based on the PRACH resources 1250, may demodulate signals 1255 received over the monitored time-frequency resources, and may decode the demodulated signals to obtain bits that indicate the random access preamble message. In some cases, receiving the random access preamble message includes receiving the random access preamble message in the subset of PRACH resources, where the random access preamble message includes a random preamble, a random OCC cover, or both. In some cases, receiving the random access preamble message for the system access in the set of PRACH resources includes receiving the random access preamble message in the subset of PRACH resources or in the second subset of PRACH resources based on a configuration of a UE 115.

A transmitter may transmit signals generated by other components of the device. In some examples, the transmitter may be collocated with a receiver in a transceiver module. For example, the transmitter may be an example of aspects of the transceiver 1435 described with reference to FIG. 14. The transmitter may utilize a single antenna or a set of antennas.

Figure 13:
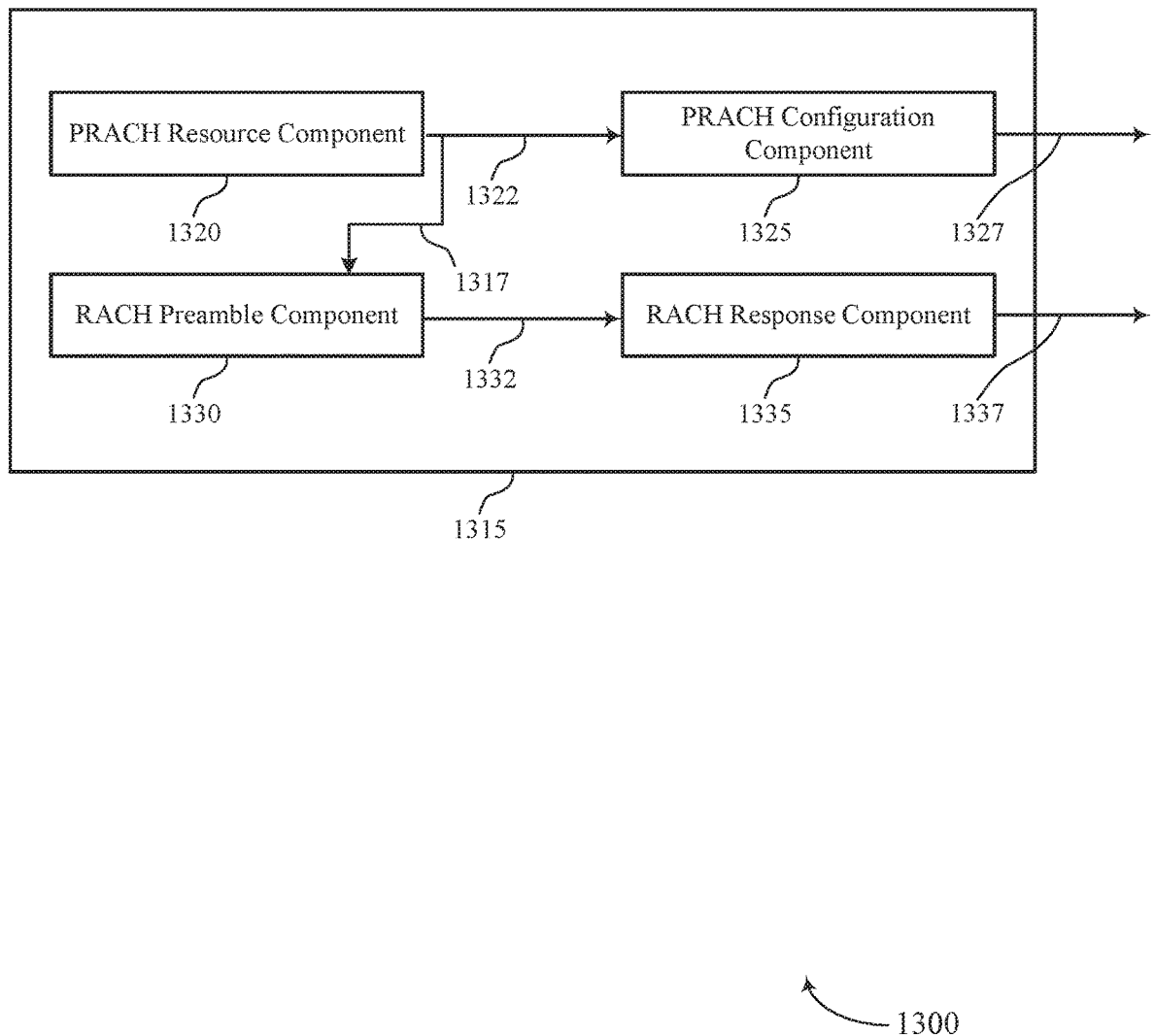

FIG. 13 shows a block diagram 1300 of a base station PRACH OCC module 1315 that supports increasing physical random access capacity using orthogonal cover codes in accordance with aspects of the present disclosure. The base station PRACH OCC module 1315 may be an example of aspects of a base station PRACH OCC module 1415 described with reference to FIGS. 11, 12, and 14. The base station PRACH OCC module 1315 may include PRACH resource component 1320, PRACH configuration component 1325, RACH preamble component 1330, and RACH response component 1335. Each of these modules may communicate, directly or indirectly, with one another (e.g., via one or more buses).

PRACH resource component 1320 may determine a set of PRACH resources, the set of PRACH resources including a subset of PRACH resources for performing system access using OCCs for random access. In some cases, the set of PRACH resources includes a second subset of PRACH resources not configured for supporting OCCs. In some cases, the subset of PRACH resources includes a set of PRACH resources that are contiguous or separated in a time domain by less than a repetition separation time threshold. In some cases, the set of concentrated PRACH resources spans a length of time greater than or equal to an OCC length. PRACH resource component 1320 may transfer PRACH resources 1322 to PRACH configuration component 1325.

PRACH configuration component 1325 may receive PRACH resources 1322 and transmit a PRACH resource configuration 1327 indicating the set of PRACH resources and the subset of PRACH resources. In some cases, the PRACH resource configuration includes a number of contiguous PRACH transmission opportunities greater than or equal to an OCC length. In some cases, the PRACH resource configuration includes PRACH transmission opportunities separated in a time domain by a length of time less than a repetition separation time threshold. In some cases, the PRACH resource configuration includes an OCC PRACH resource configuration.

RACH preamble component 1330 may receive a random access preamble message 1317 for the system access in the set of PRACH resources 1322. In some cases, receiving the random access preamble message includes receiving the random access preamble message in the subset of PRACH resources, where the random access preamble message includes a random preamble, a random OCC cover, or both. In some cases, receiving the random access preamble message for the system access in the set of PRACH resources includes receiving the random access preamble message in the subset of PRACH resources or in the second subset of PRACH resources based on a configuration of a UE. RACH preamble component 1330 may transfer information related to random access preamble message 1317 to RACH response component 1335 via random access preamble information 1332.

RACH response component 1335 may transmit a random access response message 1337 in response to the random access preamble message. In some cases, the random access response message 1337 includes a random access preamble identifier, a random access RNTI, an OCC index, or a combination thereof.

Figure 14:
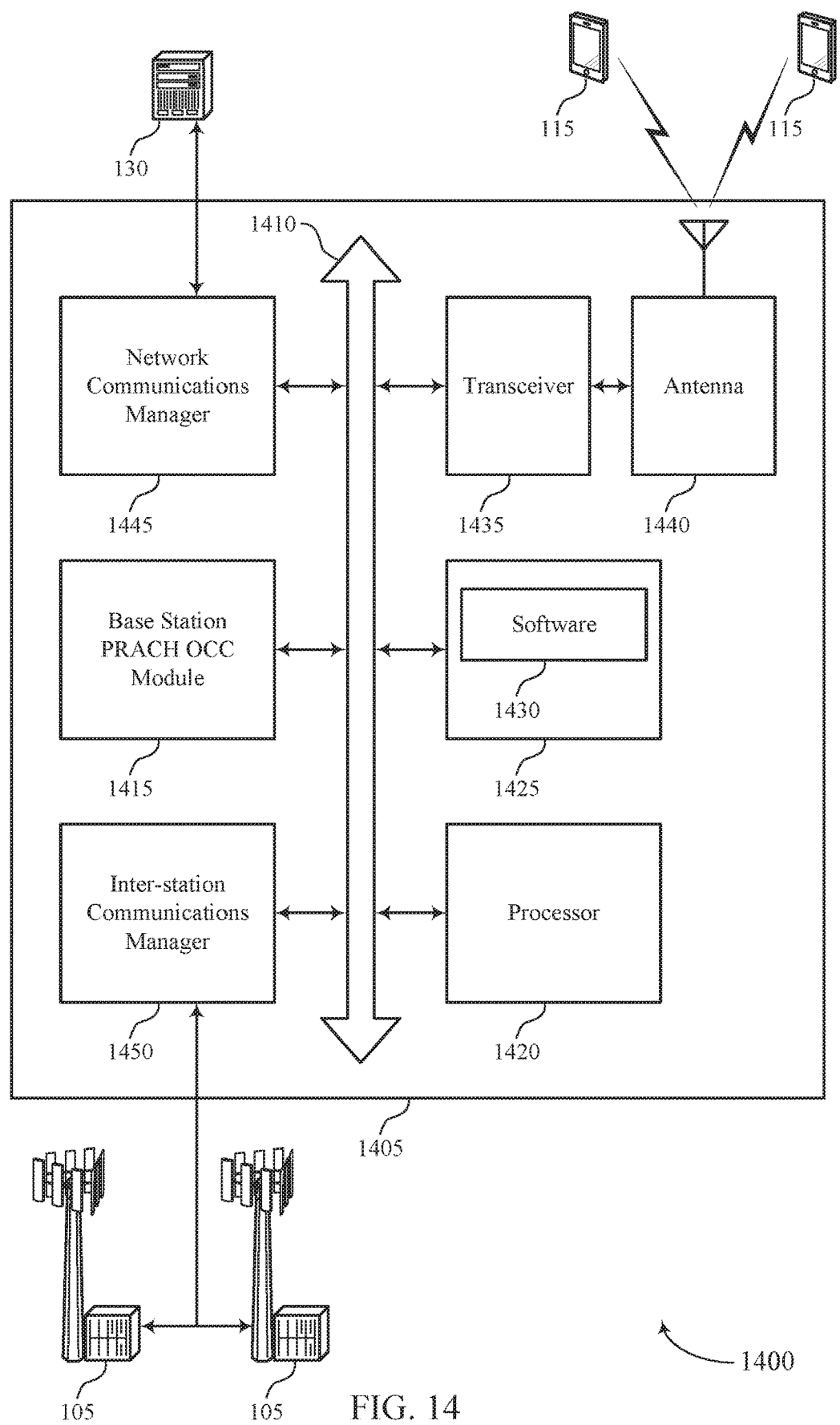
FIG. 14 illustrates a block diagram of a system including a base station that supports increasing PRACH capacity using OCCs in accordance with aspects of the present disclosure.

FIG. 14 shows a diagram of a system 1400 including a device 1405 that supports increasing physical random access capacity using orthogonal cover codes in accordance with aspects of the present disclosure. Device 1405 may be an example of or include the components of base station 105 as described above, e.g., with reference to FIGS. 1 and 2. Device 1405 may include components for bi-directional voice and data communications including components for transmitting and receiving communications, including base station PRACH OCC module 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting increasing physical random access capacity using orthogonal cover codes).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support increasing physical random access capacity using orthogonal cover codes. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
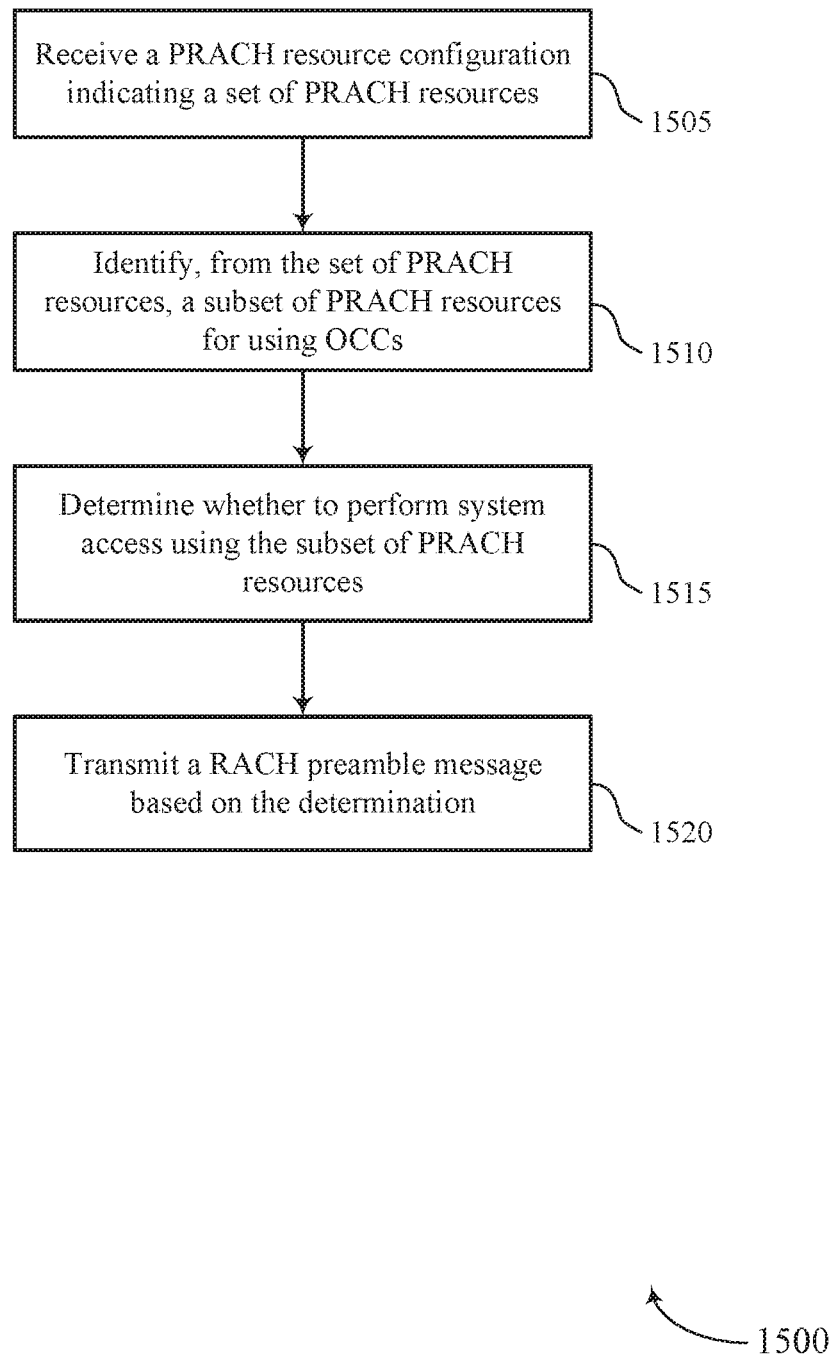
FIGS. 15 through 19 illustrate methods for increasing PRACH capacity using OCCs in accordance with aspects of the present disclosure.

FIG. 15 shows a flowchart illustrating a method 1500 for increasing PRACH capacity using OCCs in accordance with aspects of the present disclosure. The operations of method 1500 may be implemented by a UE 115 or its components as described herein. For example, the operations of method 1500 may be performed by a UE PRACH OCC module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a PRACH resource configuration indicating a set of PRACH resources for a cell. For example, the UE 115 may identify time-frequency resources over which the PRACH resource configuration may be transmitted from a base station 105 serving the cell. The UE 115 may demodulate the transmission over those time-frequency resources and decode the demodulated transmission to obtain bits that indicate the PRACH resource configuration. Based on information stored in memory, the UE 115 may determine the set of PRACH resources corresponding to the PRACH resource configuration. The operations of 1505 may be performed according to the methods described herein. In certain examples, aspects of the operations of 1505 may be performed by a PRACH reception component as described with reference to FIGS. 7 through 10.

At 1510 the UE 115 may identify, from the set of PRACH resources, a subset of PRACH resources for performing system access using OCCs. For example, the UE 115 may identify the PRACH resources supporting OCCs based on information stored in memory, such as a table of PRACH resource configurations that support OCCs, or a table of PRACH resource configurations that support OCCs. Alternatively, the UE 115 may identify the subset of PRACH resources supporting OCCs based on information included in the decoded transmission from the base station 105. In some cases, the subset of PRACH resources supporting OCCs may include the complete set of PRACH resources. The operations of 1510 may be performed according to the methods described herein. In certain examples, aspects of the operations of 1510 may be performed by a PRACH resource identifier as described with reference to FIGS. 7 through 10.

At 1515 the UE 115 may determine whether to perform system access on the cell using the subset of PRACH resources. For example, the UE 115 may identify time-frequency resources over which a random access preamble message is to be transmitted. The random access preamble message may initiate the system access procedure, and the time-frequency resources may correspond to the set of PRACH resources signaled to the UE 115. The determination may be made based on some internal logic of the UE 115. The operations of 1515 may be performed according to the methods described herein. In certain examples, aspects of the operations of 1515 may be performed by a system access determination component as described with reference to FIGS. 7 through 10.

At 1520 the UE 115 may transmit a random access preamble message for the system access based at least in part on the determining. For example, the UE 115 may encode bits that indicate the random access preamble message, modulate the transmission over the identified time-frequency resources, and apply an OCC to the modulated symbols if the UE 115 determined to transmit using an OCC. The operations of 1520 may be performed according to the methods described herein. In certain examples, aspects of the operations of 1520 may be performed by a RACH preamble component as described with reference to FIGS. 7 through 10.

Figure 16:
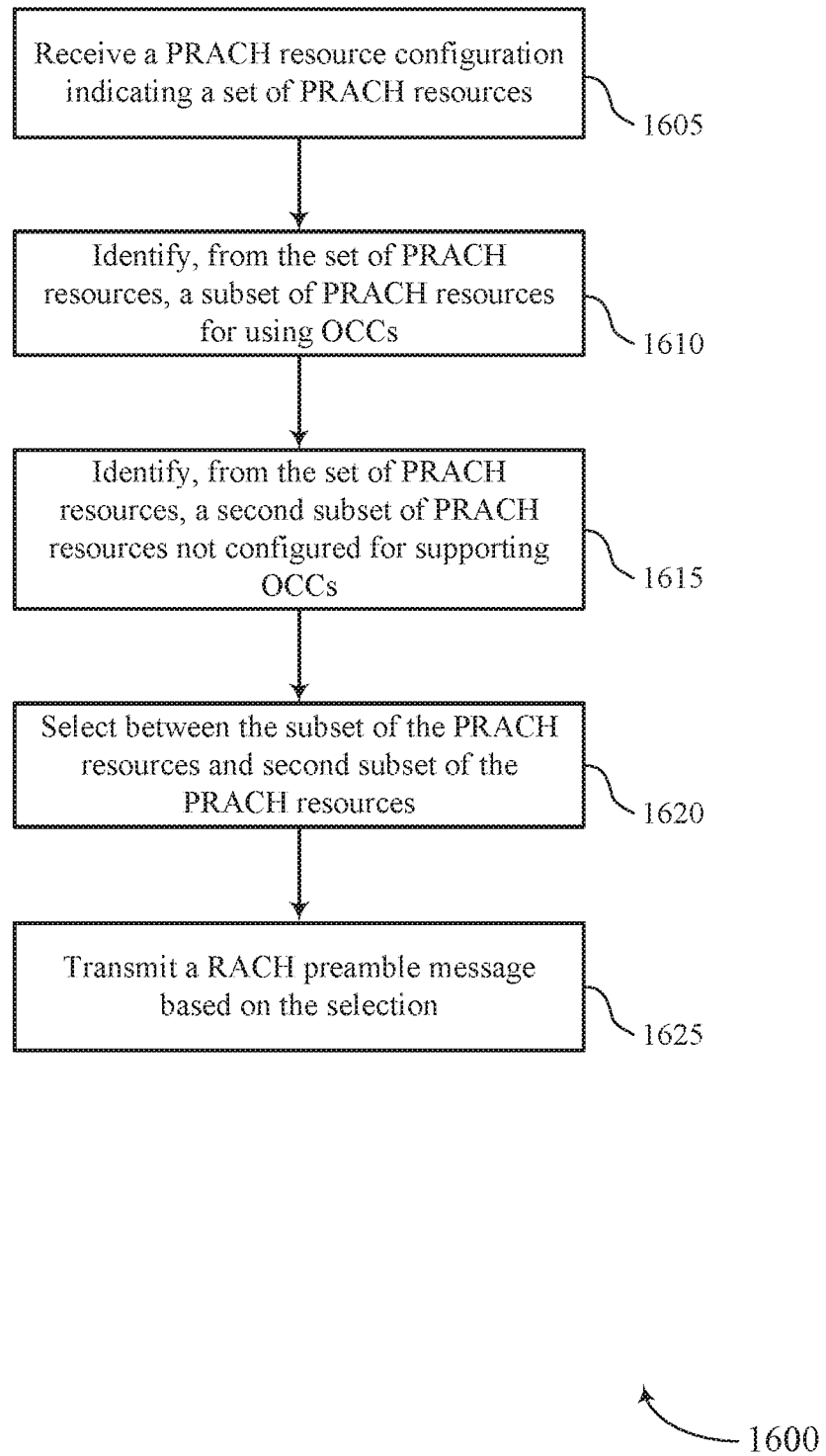

FIG. 16 shows a flowchart illustrating a method 1600 for increasing physical random access capacity using orthogonal cover codes in accordance with aspects of the present disclosure. The operations of method 1600 may be implemented by a UE 115 or its components as described herein. For example, the operations of method 1600 may be performed by a UE PRACH OCC module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a PRACH resource configuration indicating a set of PRACH resources for a cell. For example, the UE 115 may identify time-frequency resources over which the PRACH resource configuration may be transmitted from a base station 105 serving the cell. The UE 115 may demodulate the transmission over those time-frequency resources and decode the demodulated transmission to obtain bits that indicate the PRACH resource configuration. Based on information stored in memory, the UE 115 may determine the set of PRACH resources corresponding to the PRACH resource configuration. The operations of 1605 may be performed according to the methods described herein. In certain examples, aspects of the operations of 1605 may be performed by a PRACH reception component as described with reference to FIGS. 7 through 10.

At 1610 the UE 115 may identify, from the set of PRACH resources, a subset of PRACH resources for performing system access using OCCs. For example, the UE 115 may identify the PRACH resources supporting OCCs based on information stored in memory, such as a table of PRACH resource configurations that support OCCs, or a table of PRACH resource configurations that support OCCs. Alternatively, the UE 115 may identify the subset of PRACH resources supporting OCCs based on information included in the decoded transmission from the base station 105. The operations of 1610 may be performed according to the methods described herein. In certain examples, aspects of the operations of 1610 may be performed by a PRACH resource identifier as described with reference to FIGS. 7 through 10.

At 1615 the UE 115 may identify, from the set of PRACH resources, a second subset of PRACH resources not configured for supporting OCCs. For example, similar to above, the UE 115 may identify the PRACH resources not configured to support OCCs based on information stored in memory, such as a table of PRACH resource configurations that support or do not support OCCs. Alternatively, the UE 115 may identify the second subset of PRACH resources not configured to support OCCs based on explicit signaling (e.g., information included in the decoded transmission from the base station 105). The operations of 1615 may be performed according to the methods described herein. In certain examples, aspects of the operations of 1615 may be performed by a PRACH resource identifier as described with reference to FIGS. 7 through 10.

At 1620 the UE 115 may select between the subset of PRACH resources and the second subset of PRACH resources for transmission of a random access preamble message. For example, the UE 115 may identify time-frequency resources over which the random access preamble message is to be transmitted. The random access preamble message may initiate the system access procedure, and the time-frequency resources may correspond to one of the subsets of PRACH resources signaled to the UE 115. The determination may be made based on some internal logic of the UE 115, or some random or pseudo-random process, such as a random number generator internal to the UE 115. The operations of 1620 may be performed according to the methods described herein. In certain examples, aspects of the operations of 1620 may be performed by a system access determination component as described with reference to FIGS. 7 through 10.

At 1625 the UE 115 may transmit the random access preamble message for the system access based at least in part on the determining. For example, the UE 115 may encode bits that indicate the random access preamble message, modulate the transmission over the identified time-frequency resources, and apply an OCC to the modulated symbols if the UE 115 determined to transmit using an OCC in the subset of PRACH resources. The operations of 1625 may be performed according to the methods described herein. In certain examples, aspects of the operations of 1625 may be performed by a RACH preamble component as described with reference to FIGS. 7 through 10.

Figure 17:
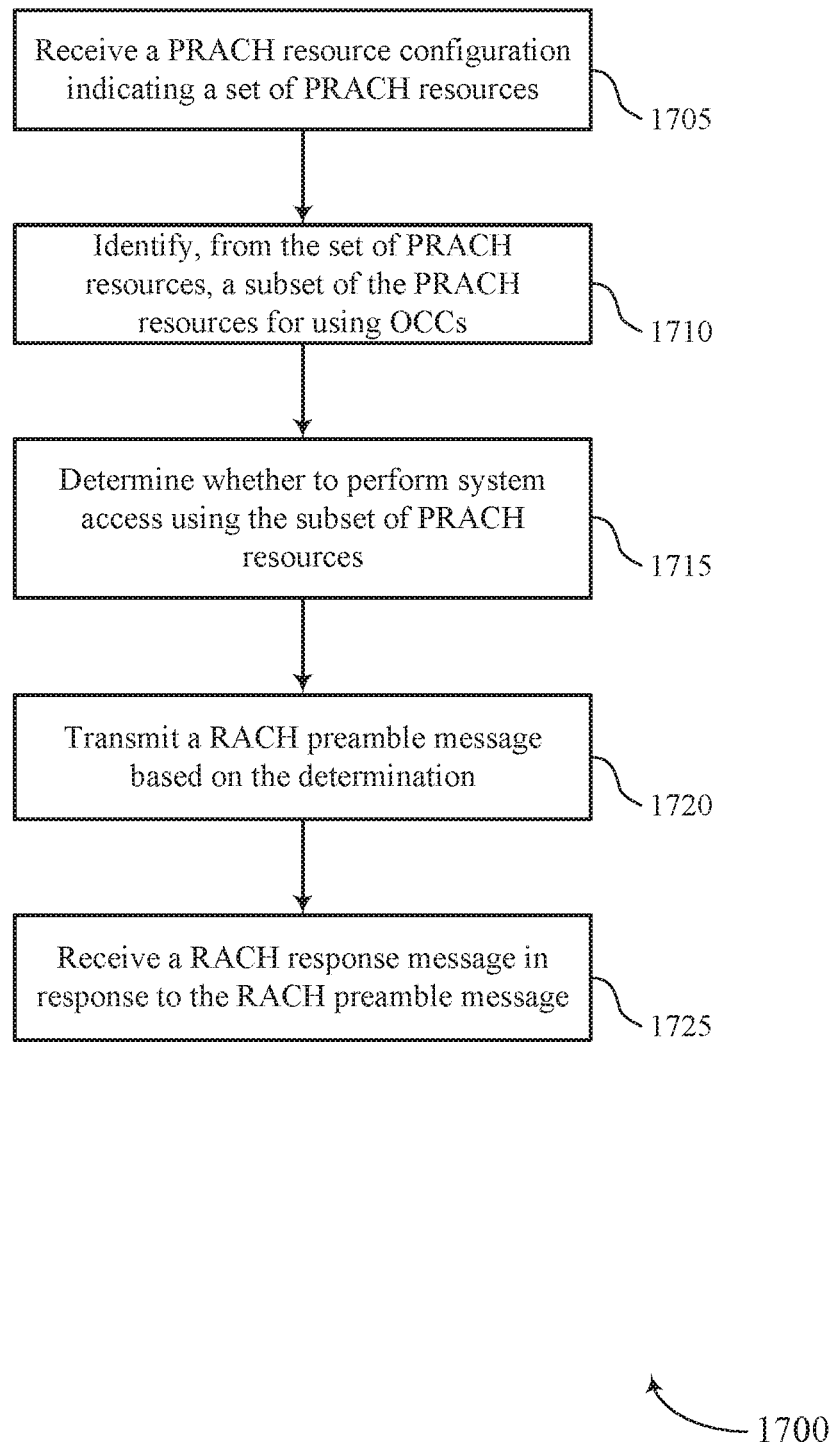

FIG. 17 shows a flowchart illustrating a method 1700 for increasing physical random access capacity using orthogonal cover codes in accordance with aspects of the present disclosure. The operations of method 1700 may be implemented by a UE 115 or its components as described herein. For example, the operations of method 1700 may be performed by a UE PRACH OCC module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a PRACH resource configuration indicating a set of PRACH resources for a cell. For example, the UE 115 may identify time-frequency resources over which the PRACH resource configuration may be transmitted from a base station 105 serving the cell. The UE 115 may demodulate the transmission over those time-frequency resources and decode the demodulated transmission to obtain bits that indicate the PRACH resource configuration. Based on information stored in memory, the UE 115 may determine the set of PRACH resources corresponding to the PRACH resource configuration. The operations of 1705 may be performed according to the methods described herein. In certain examples, aspects of the operations of 1705 may be performed by a PRACH reception component as described with reference to FIGS. 7 through 10.

At 1710 the UE 115 may identify, from the set of PRACH resources, a subset of PRACH resources for performing system access using OCCs. For example, the UE 115 may identify the PRACH resources supporting OCCs based on information stored in memory, such as a table of PRACH resource configurations that support OCCs, or a table of PRACH resource configurations that support OCCs. Alternatively, the UE 115 may identify the subset of PRACH resources supporting OCCs based on information included in the decoded transmission from the base station 105. In some cases, the subset of PRACH resources supporting OCCs may include the complete set of PRACH resources. The operations of 1710 may be performed according to the methods described herein. In certain examples, aspects of the operations of 1710 may be performed by a PRACH resource identifier as described with reference to FIGS. 7 through 10.

At 1715 the UE 115 may determine whether to perform system access on the cell using the subset of PRACH resources. For example, the UE 115 may identify time-frequency resources over which a random access preamble message is to be transmitted. The random access preamble message may initiate the system access procedure, and the time-frequency resources may correspond to the set of PRACH resources signaled to the UE 115. The determination may be made based on some internal logic of the UE 115. The operations of 1715 may be performed according to the methods described herein. In certain examples, aspects of the operations of 1715 may be performed by a system access determination component as described with reference to FIGS. 7 through 10.

At 1720 the UE 115 may transmit a random access preamble message for the system access based at least in part on the determining. For example, the UE 115 may encode bits that indicate the random access preamble message, modulate the transmission over the identified time-frequency resources, and apply an OCC to the modulated symbols if the UE 115 determined to transmit using an OCC. The operations of 1720 may be performed according to the methods described herein. In certain examples, aspects of the operations of 1720 may be performed by a RACH preamble component as described with reference to FIGS. 7 through 10.

At 1725 the UE 115 may receive a random access response message in response to the random access preamble message. For example, the UE 115 may identify time-frequency resources over which the random access response message may be transmitted from the base station 105 in response to the random access preamble message. The UE 115 may demodulate the transmission over those time-frequency resources and decode the demodulated transmission to obtain bits that indicate the random access response message. In some cases, the UE 115 may use an RNTI to decode the demodulated transmission, and may determine that a set of obtained bits correspond to the random access response message for the transmitted random access preamble message based on an OCC-specific RNTI, an OCC index, or a preamble index of the random access response message. The operations of 1725 may be performed according to the methods described herein. In certain examples, aspects of the operations of 1725 may be performed by a RACH response component as described with reference to FIGS. 7 through 10.

Figure 18:
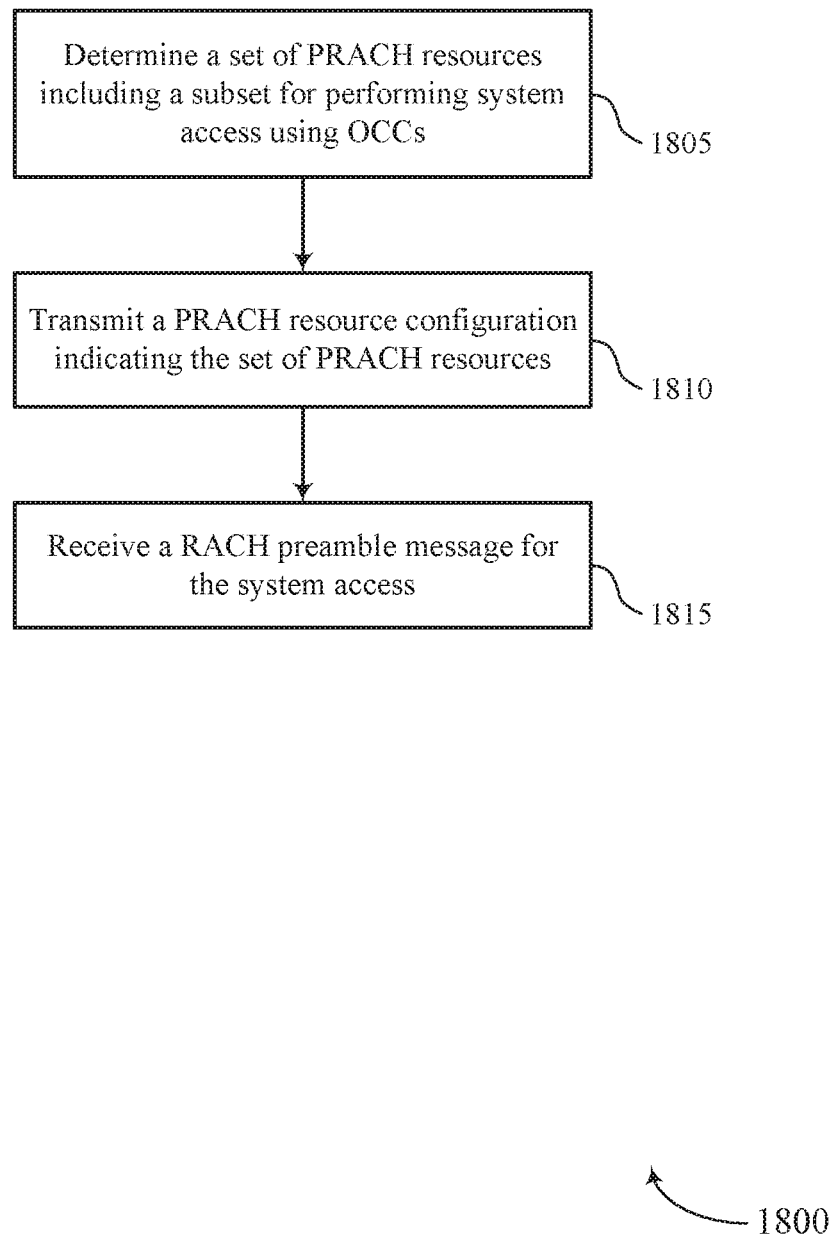

FIG. 18 shows a flowchart illustrating a method 1800 for increasing physical random access capacity using orthogonal cover codes in accordance with aspects of the present disclosure. The operations of method 1800 may be implemented by a base station 105 or its components as described herein. For example, the operations of method 1800 may be performed by a base station PRACH OCC module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may determine a set of PRACH resources, the set of PRACH resources comprising a subset of PRACH resources for performing system access using OCCs for random access. For example, in some cases, the base station 105 may determine the set of PRACH resources based on a configuration stored in memory of the base station 105. In other cases, the base station 105 may determine the set of PRACH resources based on measuring a channel quality of the PRACH (e.g., the base station 105 may monitor the time-frequency resources corresponding to the PRACH, demodulate received signals over these time-frequency resources, and decode the demodulated signals to obtain bits indicating information about the channel quality) and selecting a PRACH configuration based on the determined channel quality. The operations of 1805 may be performed according to the methods described herein. In certain examples, aspects of the operations of 1805 may be performed by a PRACH resource component as described with reference to FIGS. 11 through 14.

At 1810 the base station 105 may transmit a PRACH resource configuration indicating the set of PRACH resources and the subset of PRACH resources. For example, the base station 105 may encode bits that indicate the PRACH resource configuration, identify time-frequency resources over which the PRACH resource configuration is to be transmitted, and modulate the transmission over the identified time-frequency resources. The operations of 1810 may be performed according to the methods described herein. In certain examples, aspects of the operations of 1810 may be performed by a PRACH configuration component as described with reference to FIGS. 11 through 14.

At 1815 the base station 105 may receive a random access preamble message for the system access in the set of PRACH resources. For example, the base station 105 may identify time-frequency resources over which the random access preamble message may be transmitted from a UE 115. The time-frequency resources may correspond to the set of PRACH resources indicated by the transmitted PRACH resource configuration. The base station 105 may demodulate the transmission over those time-frequency resources and decode the demodulated transmission to obtain bits that indicate the random access preamble message. The operations of 1815 may be performed according to the methods described herein. In certain examples, aspects of the operations of 1815 may be performed by a RACH preamble component as described with reference to FIGS. 11 through 14.

Figure 19:
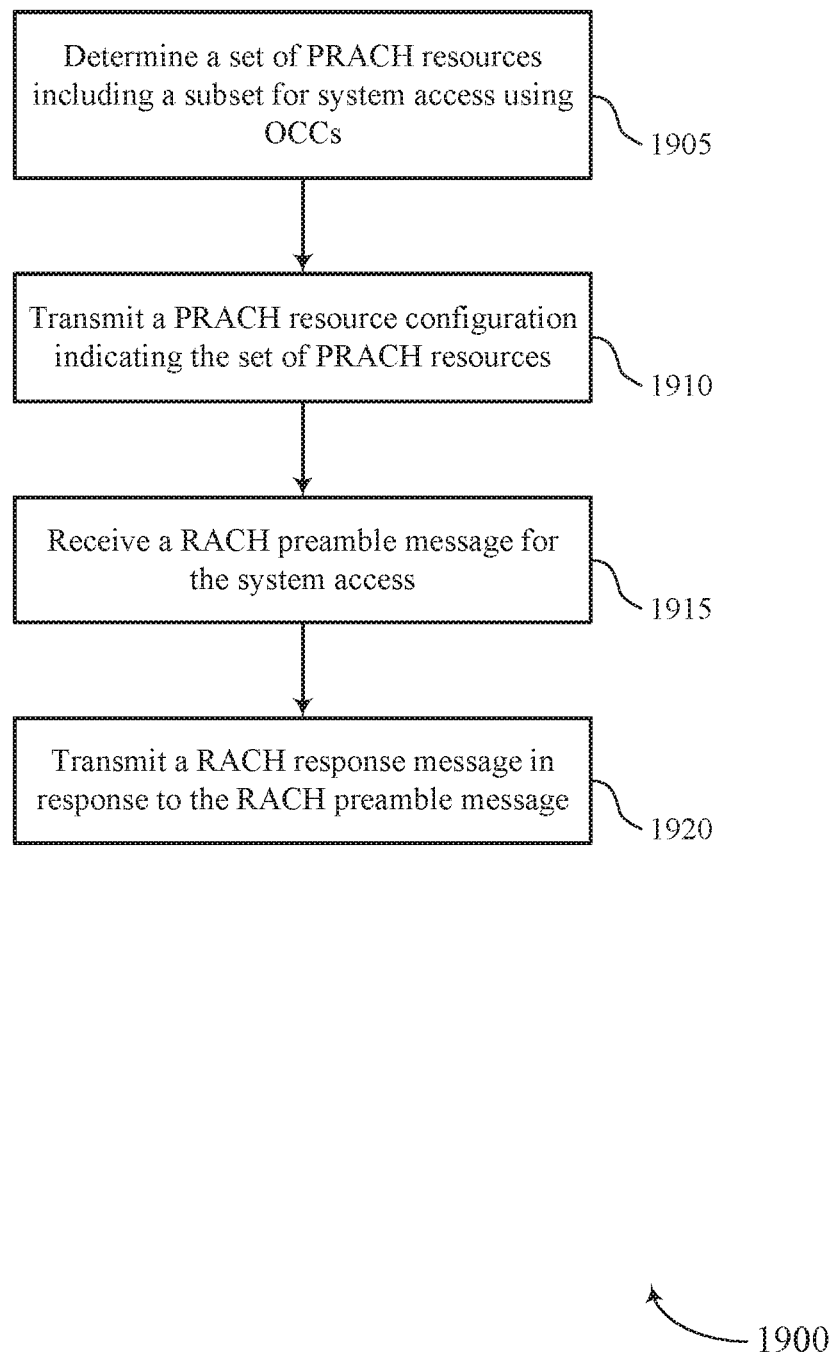

FIG. 19 shows a flowchart illustrating a method 1900 for increasing physical random access capacity using orthogonal cover codes in accordance with aspects of the present disclosure. The operations of method 1900 may be implemented by a base station 105 or its components as described herein. For example, the operations of method 1900 may be performed by a base station PRACH OCC module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may determine a set of PRACH resources, the set of PRACH resources comprising a subset of PRACH resources for performing system access using OCCs for random access. For example, in some cases, the base station 105 may determine the set of PRACH resources based on a configuration stored in memory of the base station 105. In other cases, the base station 105 may determine the set of PRACH resources based on measuring a channel quality of the PRACH (e.g., the base station 105 may monitor the time-frequency resources corresponding to the PRACH, demodulate received signals over these time-frequency resources, and decode the demodulated signals to obtain bits indicating information about the channel quality) and selecting a PRACH configuration based on the determined channel quality. The operations of 1905 may be performed according to the methods described herein. In certain examples, aspects of the operations of 1905 may be performed by a PRACH resource component as described with reference to FIGS. 11 through 14.

At 1910 the base station 105 may transmit a PRACH resource configuration indicating the set of PRACH resources and the subset of the set of PRACH resources. For example, the base station 105 may encode bits that indicate the PRACH resource configuration, identify time-frequency resources over which the PRACH resource configuration is to be transmitted, and modulate the transmission over the identified time-frequency resources. The operations of 1910 may be performed according to the methods described herein. In certain examples, aspects of the operations of 1910 may be performed by a PRACH configuration component as described with reference to FIGS. 11 through 14.

At 1915 the base station 105 may receive a random access preamble message for the system access in the set of PRACH resources. For example, the base station 105 may identify time-frequency resources over which the random access preamble message may be transmitted from a UE 115. The time-frequency resources may correspond to the set of PRACH resources indicated by the transmitted PRACH resource configuration. The base station 105 may demodulate the transmission over those time-frequency resources and decode the demodulated transmission to obtain bits that indicate the random access preamble message. The operations of 1915 may be performed according to the methods described herein. In certain examples, aspects of the operations of 1915 may be performed by a RACH preamble component as described with reference to FIGS. 11 through 14.

At 1920 the base station 105 may transmit a random access response message in response to the random access preamble message. For example, the base station 105 may encode bits that indicate the random access response message, identify time-frequency resources over which the random access response message is to be transmitted, and modulate the transmission over the identified time-frequency resources. The operations of 1920 may be performed according to the methods described herein. In certain examples, aspects of the operations of 1920 may be performed by a RACH response component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.
transmit in based on one or more parameters.

What is claimed is:

1. A method for wireless communication, comprising:
   receiving a physical random access channel (PRACH) resource configuration indicating a set of PRACH resources for a cell, wherein the PRACH resource configuration supports orthogonal cover codes (OCCs) based at least in part on the set of PRACH resources and an OCC applicability criteria associated with supporting the OCCs for the set of PRACH resources, the set of PRACH resources comprising a subset of PRACH resources configured for performing system access using the OCCs based at least in part on the PRACH resource configuration supporting the OCCs; and
   transmitting a random access preamble message for the system access based at least in part on determining whether to perform the system access on the cell using the subset of PRACH resources.

2. The method of claim 1, wherein the OCC applicability criteria comprises a number of PRACH transmission opportunities greater than or equal to an OCC length.

3. The method of claim 1, wherein the OCC applicability criteria comprises a repetition separation time threshold, and wherein the PRACH resource configuration comprises PRACH transmission opportunities separated in a time domain by a length of time less than the repetition separation time threshold.

4. The method of claim 1, further comprising:
   receiving a random access response message in response to the random access preamble message.

5. The method of claim 4, further comprising:
   identifying the random access response message based at least in part on a random access preamble identifier of the random access response message, a random access radio network temporary identifier (RNTI) of the random access response message, an OCC index included in the random access response message, or a combination thereof.

6. A method for wireless communication, comprising:
receiving a physical random access channel (PRACH) resource configuration indicating a set of PRACH resources for a cell, the set of PRACH resources comprising a first subset of PRACH resources configured for performing system access using orthogonal cover codes (OCCs) and a second subset of PRACH resources not configured for supporting the OCCs; and
transmitting a random access preamble message for the system access based at least in part on determining whether to perform the system access on the cell using the first subset of PRACH resources or the second subset of PRACH resources.

7. The method of claim 6, wherein determining whether to perform the system access on the cell using the first subset of PRACH resources or the second subset of PRACH resources comprises:
selecting between the first subset of PRACH resources and the second subset of PRACH resources based at least in part on a random or pseudo-random function; and
performing the system access on the cell based at least in part on the selection.

8. The method of claim 7, further comprising:
identifying a weight value associated with selecting either the first subset of PRACH resources or the second subset of PRACH resources, wherein selecting between the first subset of PRACH resources and the second subset of PRACH resources is based at least in part on the weight value.

9. The method of claim 6, further comprising:
determining whether to perform the system access on the cell using the first subset of PRACH resources or the second subset of PRACH resources based at least in part on a transmission type associated with the system access.

10. The method of claim 9, wherein the transmission type comprises a first type of system access for radio resource control (RRC) connection or a second type of system access for connection-less data transmission.

11. A method for wireless communication, comprising:
receiving a physical random access channel (PRACH) resource configuration indicating a set of PRACH resources for a cell, the set of PRACH resources comprising a subset of PRACH resources configured for performing system access using orthogonal cover codes (OCCs), wherein:
the PRACH resource configuration comprises an OCC PRACH resource configuration;
the subset of PRACH resources are contiguous or separated in a time domain by less than a repetition separation time threshold; and
the subset of PRACH resources spans a length of time greater than or equal to an OCC length fora random access preamble message; and
transmitting the random access preamble message for the system access based at least in part on determining whether to perform the system access on the cell using the subset of PRACH resources.

12. The method of claim 11, further comprising:
identifying, from the set of PRACH resources, a second subset of PRACH resources not configured for supporting the OCCs, wherein the second subset of PRACH resources comprises a set of resources that are separated in the time domain by an equal number of subframes or separated in the time domain by either a first number of subframes or a second number of subframes differing from the first number by one subframe.

13. A method for wireless communication, comprising:
receiving a physical random access channel (PRACH) resource configuration indicating a set of PRACH resources for a cell, the set of PRACH resources comprising a subset of PRACH resources configured for performing system access using orthogonal cover codes (OCCs);
receiving a downlink control information (DCI) transmission comprising an OCC index, a random access preamble, or both; and
transmitting a random access preamble message for the system access based at least in part on determining whether to perform the system access on the cell using the subset of PRACH resources, wherein determining whether to perform the system access on the cell using the subset of PRACH resources is based at least in part on the DCI transmission.

14. A method for wireless communication, comprising:
receiving a physical random access channel (PRACH) resource configuration indicating a set of PRACH resources for a cell, the set of PRACH resources comprising a subset of PRACH resources configured for performing system access using orthogonal cover codes (OCCs);
determining an OCC length for the system access based at least in part on the PRACH resource configuration; and
transmitting a random access preamble message for the system access based at least in part on the determined OCC length and based at least in part on determining whether to perform the system access on the cell using the subset of PRACH resources.

15. A method for wireless communication, comprising:
receiving a physical random access channel (PRACH) resource configuration indicating a set of PRACH resources for a cell, the set of PRACH resources comprising a subset of PRACH resources configured for performing system access using orthogonal cover codes (OCCs); and
performing frequency hopping for transmitting a random access preamble message for the system access based at least in part on determining whether to perform the system access on the cell using the subset of PRACH resources, wherein the frequency hopping is based at least in part on an OCC length for the system access.

16. A method for wireless communication, comprising:
receiving a physical random access channel (PRACH) resource configuration indicating a set of PRACH resources for a cell, the set of PRACH resources comprising a subset of PRACH resources configured for performing system access using orthogonal cover codes (OCCs);
selecting, fora random access preamble message, a random preamble, a random OCC cover, or both; and
transmitting the random access preamble message for the system access based at least in part on the selecting and based at least in part on determining whether to perform the system access on the cell using the subset of PRACH resources.

17. An apparatus for wireless communication, comprising:

means for receiving a physical random access channel (PRACH) resource configuration indicating a set of PRACH resources for a cell, wherein the PRACH resource configuration supports orthogonal cover codes (OCCs) based at least in part on the set of PRACH resources and an OCC applicability criteria associated with supporting the OCCs for the set of PRACH resources, the set of PRACH resources comprising a subset of PRACH resources for performing system access using the OCCs based at least in part on the PRACH resource configuration supporting the OCCs; and means for transmitting a random access preamble message for the system access based at least in part on determining whether to perform the system access on the cell using the subset of PRACH resources.

18. An apparatus for wireless communication, comprising:
a processor;
memory coupled with the processor; and
instructions stored in the memory and executable by the processor to cause the apparatus to:
receive a physical random access channel (PRACH) resource configuration indicating a set of PRACH resources for a cell, wherein the PRACH resource configuration supports orthogonal cover codes (OCCs) based at least in part on the set of PRACH resources and an OCC applicability criteria associated with supporting the OCCs for the set of PRACH resources, the set of PRACH resources comprising a subset of PRACH resources for performing system access using the OCCs based at least in part on the PRACH resource configuration supporting the OCCs;
and transmit a random access preamble message for the system access based at least in part on determining whether to perform the system access on the cell using the subset of PRACH resources.

19. The apparatus of claim 18, wherein the OCC applicability criteria comprises a number of PRACH transmission opportunities greater than or equal to an OCC length.

20. The apparatus of claim 18, wherein the OCC applicability criteria comprises a repetition separation time threshold, and wherein the PRACH resource configuration comprises PRACH transmission opportunities separated in a time domain by a length of time less than the repetition separation time threshold.

21. An apparatus for wireless communication, comprising:
a processor;
memory coupled with the processor; and
instructions stored in the memory and executable by the processor to cause the apparatus to:
receive a physical random access channel (PRACH) resource configuration indicating a set of PRACH resources for a cell, the set of PRACH resources comprising a first subset of PRACH resources configured for performing system access using orthogonal cover codes (OCCs) and a second subset of PRACH resources not configured for supporting the OCCs; and
transmit a random access preamble message for the system access based at least in part on determining whether to perform the system access on the cell using the first subset of PRACH resources or the second subset of PRACH resources.

22. The apparatus of claim 21, wherein the instructions to determine whether to perform the system access on the cell using the first subset of PRACH resources or the second subset of PRACH resources are executable by the processor to cause the apparatus to:
select between the first subset of PRACH resources and the second subset of PRACH resources based at least in part on a random or pseudo-random function; and
perform the system access on the cell based at least in part on the selection.

23. The apparatus of claim 22, wherein the instructions are executable by the processor to cause the apparatus to:
identify a weight value associated with selecting either the first subset of PRACH resources or the second subset of PRACH resources, wherein selecting between the first subset of PRACH resources and the second subset of PRACH resources is based at least in part on the weight value.

24. The apparatus of claim 21, wherein the instructions are executable by the processor to cause the apparatus to:
determine whether to perform the system access on the cell using the first subset of PRACH resources or the second subset of PRACH resources based at least in part on a transmission type associated with the system access.

25. The apparatus of claim 24, wherein the transmission type comprises a first type of system access for radio resource control (RRC) connection or a second type of system access for connection-less data transmission.

26. An apparatus for wireless communication, comprising:
a processor;
memory coupled with the processor; and
instructions stored in the memory and executable by the processor to cause the apparatus to:
receive a physical random access channel (PRACH) resource configuration indicating a set of PRACH resources for a cell, the set of PRACH resources comprising a subset of PRACH resources configured for performing system access using orthogonal cover codes (OCCs), wherein:
the PRACH resource configuration comprises an OCC PRACH resource configuration;
the subset of PRACH resources are contiguous or separated in a time domain by less than a repetition separation time threshold; and
the subset of PRACH resources spans a length of time greater than or equal to an OCC length for a random access preamble message; and
transmit the random access preamble message for the system access based at least in part on determining whether to perform the system access on the cell using the subset of PRACH resources.

27. A non-transitory computer-readable medium storing code for wireless communication, the code comprising instructions executable by a processor to:
receive a physical random access channel (PRACH) resource configuration indicating a set of PRACH resources for a cell, wherein the PRACH resource configuration supports orthogonal cover codes (OCCs) based at least in part on the set of PRACH resources and an OCC applicability criteria associated with supporting the OCCs for the set of PRACH resources, the set of PRACH resources comprising a subset of PRACH resources configured for performing system access using the OCCs based at least in part on the PRACH resource configuration supporting the OCCs;

and
transmit a random access preamble message for the system access based at least in part on determining whether to perform the system access on the cell using the subset of PRACH resources.

28. An apparatus for wireless communication, comprising:
means for receiving a physical random access channel (PRACH) resource configuration indicating a set of PRACH resources for a cell, the set of PRACH resources comprising a first subset of PRACH resources configured for performing system access using orthogonal cover codes (OCCs) and a second subset of PRACH resources not configured for supporting the OCCs; and
means for transmitting a random access preamble message for the system access based at least in part on determining whether to perform the system access on the cell using the first subset of PRACH resources or the second subset of PRACH resources.

29. An apparatus for wireless communication, comprising:
means for receiving a physical random access channel (PRACH) resource configuration indicating a set of PRACH resources for a cell, the set of PRACH resources comprising a subset of PRACH resources configured for performing system access using orthogonal cover codes (OCCs), wherein:
the PRACH resource configuration comprises an OCC PRACH resource configuration;
the subset of PRACH resources are contiguous or separated in a time domain by less than a repetition separation time threshold; and
the subset of PRACH resources spans a length of time greater than or equal to an OCC length for a random access preamble message; and
means for transmitting the random access preamble message for the system access based at least in part on determining whether to perform the system access on the cell using the subset of PRACH resources.

30. An apparatus for wireless communication, comprising:
means for receiving a physical random access channel (PRACH) resource configuration indicating a set of PRACH resources for a cell, the set of PRACH resources comprising a subset of PRACH resources configured for performing system access using orthogonal cover codes (OCCs);
means for receiving a downlink control information (DCI) transmission comprising an OCC index, a random access preamble, or both; and
means for transmitting a random access preamble message for the system access based at least in part on determining whether to perform the system access on the cell using the subset of PRACH resources, wherein determining whether to perform the system access on the cell using the subset of PRACH resources is based at least in part on the DCI transmission.

31. An apparatus for wireless communication, comprising:
means for receiving a physical random access channel (PRACH) resource configuration indicating a set of PRACH resources for a cell, the set of PRACH resources comprising a subset of PRACH resources configured for performing system access using orthogonal cover codes (OCCs);
means for determining an OCC length for the system access based at least in part on the PRACH resource configuration; and
means for transmitting a random access preamble message for the system access based at least in part on the determined OCC length and based at least in part on determining whether to perform the system access on the cell using the subset of PRACH resources.

32. An apparatus for wireless communication, comprising:
means for receiving a physical random access channel (PRACH) resource configuration indicating a set of PRACH resources for a cell, the set of PRACH resources comprising a subset of PRACH resources configured for performing system access using orthogonal cover codes (OCCs); and
means for performing frequency hopping for transmitting a random access preamble message for the system access based at least in part on determining whether to perform the system access on the cell using the subset of PRACH resources, wherein the frequency hopping is based at least in part on an OCC length for the system access.

33. An apparatus for wireless communication, comprising:
means for receiving a physical random access channel (PRACH) resource configuration indicating a set of PRACH resources for a cell, the set of PRACH resources comprising a subset of PRACH resources configured for performing system access using orthogonal cover codes (OCCs);
means for selecting, for a random access preamble message, a random preamble, a random OCC cover, or both; and
means for transmitting the random access preamble message for the system access based at least in part on the selecting and based at least in part on determining whether to perform the system access on the cell using the subset of PRACH resources.

34. An apparatus for wireless communication, comprising:
a processor;
memory coupled with the processor; and
instructions stored in the memory and executable by the processor to cause the apparatus to:
receive a physical random access channel (PRACH) resource configuration indicating a set of PRACH resources for a cell, the set of PRACH resources comprising a subset of PRACH resources configured for performing system access using orthogonal cover codes (OCCs);
receive a downlink control information (DCI) transmission comprising an OCC index, a random access preamble, or both; and
transmit a random access preamble message for the system access based at least in part on determining whether to perform the system access on the cell using the subset of PRACH resources, wherein determining whether to perform the system access on the cell using the subset of PRACH resources is based at least in part on the DCI transmission.

35. An apparatus for wireless communication, comprising:
a processor;
memory coupled with the processor; and
instructions stored in the memory and executable by the processor to cause the apparatus to:

receive a physical random access channel (PRACH) resource configuration indicating a set of PRACH resources for a cell, the set of PRACH resources comprising a subset of PRACH resources configured for performing system access using orthogonal cover codes (OCCs);

determine an OCC length for the system access based at least in part on the PRACH resource configuration; and transmit a random access preamble message for the system access based at least in part on the determined OCC length and based at least in part on determining whether to perform the system access on the cell using the subset of PRACH resources.

36. An apparatus for wireless communication, comprising:

a processor;

memory coupled with the processor; and instructions stored in the memory and executable by the processor to cause the apparatus to:

receive a physical random access channel (PRACH) resource configuration indicating a set of PRACH resources for a cell, the set of PRACH resources comprising a subset of PRACH resources configured for performing system access using orthogonal cover codes (OCCs); and perform frequency hopping for transmitting a random access preamble message for the system access based at least in part on determining whether to perform the system access on the cell using the subset of PRACH resources, wherein the frequency hopping is based at least in part on an OCC length for the system access.

37. An apparatus for wireless communication, comprising:

a processor;

memory coupled with the processor; and instructions stored in the memory and executable by the processor to cause the apparatus to:

receive a physical random access channel (PRACH) resource configuration indicating a set of PRACH resources for a cell, the set of PRACH resources comprising a subset of PRACH resources configured for performing system access using orthogonal cover codes (OCCs);

select, for a random access preamble message, a random preamble, a random OCC cover, or both; and transmit the random access preamble message for the system access based at least in part on the selecting and based at least in part on determining whether to perform the system access on the cell using the subset of PRACH resources.

* * * * *